(12) United States Patent
Axen et al.

(10) Patent No.: US 6,270,228 B1
(45) Date of Patent: Aug. 7, 2001

(54) STUDIO LIGHTING SYSTEM

(75) Inventors: Bradley D. Axen, Villa Park; Denis H. Crawford, Long Beach, both of CA (US)

(73) Assignee: Astron Systems, Inc., Yorba Linda, CA (US)

(*) Notice: Subject to any disclaimer, the term of this patent is extended or adjusted under 35 U.S.C. 154(b) by 0 days.

(21) Appl. No.: 09/282,457

(22) Filed: Mar. 31, 1999

(51) Int. Cl.$^7$ .................................................. G03B 15/02
(52) U.S. Cl. .................................. 362/3; 362/11; 362/33; 362/225; 362/233; 362/234; 362/293; 396/155; 396/164; 396/182
(58) Field of Search ......................... 362/3, 5, 11, 18, 362/33, 227, 234, 233, 225, 295, 293; 396/4, 164–182, 155

(56) References Cited

U.S. PATENT DOCUMENTS

| | | | |
|---|---|---|---|
| 3,643,085 | 2/1972 | Durand | 240/20 |
| 3,733,480 | 5/1973 | Glenn, Jr. | 240/20 |
| 3,958,115 | 5/1976 | Schmidt | 240/1.3 |
| 4,101,953 | 7/1978 | Anderson et al. | 362/11 |
| 4,176,389 | 11/1979 | Harvey et al. | 362/5 |
| 4,319,311 | * 3/1982 | Mitchell | 362/250 |
| 4,325,104 | 4/1982 | Broadt et al. | 362/11 |
| 4,329,739 | 5/1982 | Loebner | 362/153 |
| 4,371,913 | 2/1983 | Broadt et al. | 362/17 |
| 4,399,490 | 8/1983 | Broadt | 362/11 |
| 4,462,063 | 7/1984 | English | 362/11 |
| 4,475,146 | 10/1984 | Wally, Jr. | 362/11 |
| 4,515,558 | 5/1985 | Hall, Jr. et al. | 431/359 |
| 4,690,637 | 9/1987 | Brower | 431/359 |
| 4,758,856 | 7/1988 | Moss | 354/292 |
| 4,777,566 | * 10/1988 | Lowell et al. | 362/3 |
| 4,843,521 | 6/1989 | Plofchan | 362/16 |
| 4,893,223 | 1/1990 | Arnold | 362/252 |
| 4,951,076 | 8/1990 | Baillie-Hamilton et al. | 354/291 |
| 5,012,396 | 4/1991 | Costa | 362/224 |
| 5,067,049 | 11/1991 | Milaire | 362/18 |
| 5,077,640 | 12/1991 | Butler, Jr. | 362/11 |
| 5,117,249 | 5/1992 | Spector | 354/291 |
| 5,122,940 | 6/1992 | Wiegand | 362/249 |
| 5,235,368 | 8/1993 | Oglesbee | 354/291 |
| 5,235,497 | 8/1993 | Costa | 362/224 |
| 5,323,301 | 6/1994 | Kaufman | 362/287 |
| 5,352,958 | 10/1994 | Cunningham et al. | 315/291 |
| 5,369,554 | 11/1994 | Erion | 362/31 |
| 5,400,224 | 3/1995 | DuNah et al. | 362/31 |
| 5,481,439 | 1/1996 | Goto | 362/5 |
| 5,530,322 | 6/1996 | Ference et al. | 315/295 |
| 5,604,550 | 2/1997 | White | 396/429 |
| 5,664,232 | 9/1997 | Goto | 396/1 |
| 5,704,702 | * 1/1998 | Goto | 362/5 |
| 5,904,417 | * 5/1999 | Hewett | 362/321 |

* cited by examiner

*Primary Examiner*—Sandra O'Shea
*Assistant Examiner*—Bertrand Zeade
(74) *Attorney, Agent, or Firm*—Rosenberg, Klein & Lee

(57) ABSTRACT

A studio lighting system includes independently positionable light holding modules, i.e., shooting table, rear cove, and dome cove, each carrying a plurality of dimmable light sources surrounded by gel holders extending the length of each light source. Gels of any type, i.e., color, neutral density, or opaque, may be inserted within the gel holder, so that the light irradiated from the light source towards the object to be photographed or digitally captured is "blocked" or "gel colored", as desired. A desired lighting scene characterized by position and type of the gels, and intensity levels of the light sources, is recorded into the memory and can be retrieved from there for reproducing the lighting scene in further photography processes. Control panel secured to the shooting table provides a complete control of all components of the lighting scene for a photographer, so that simultaneously with viewing through the camera, the photographer can adjust any components of the lighting scene.

20 Claims, 37 Drawing Sheets

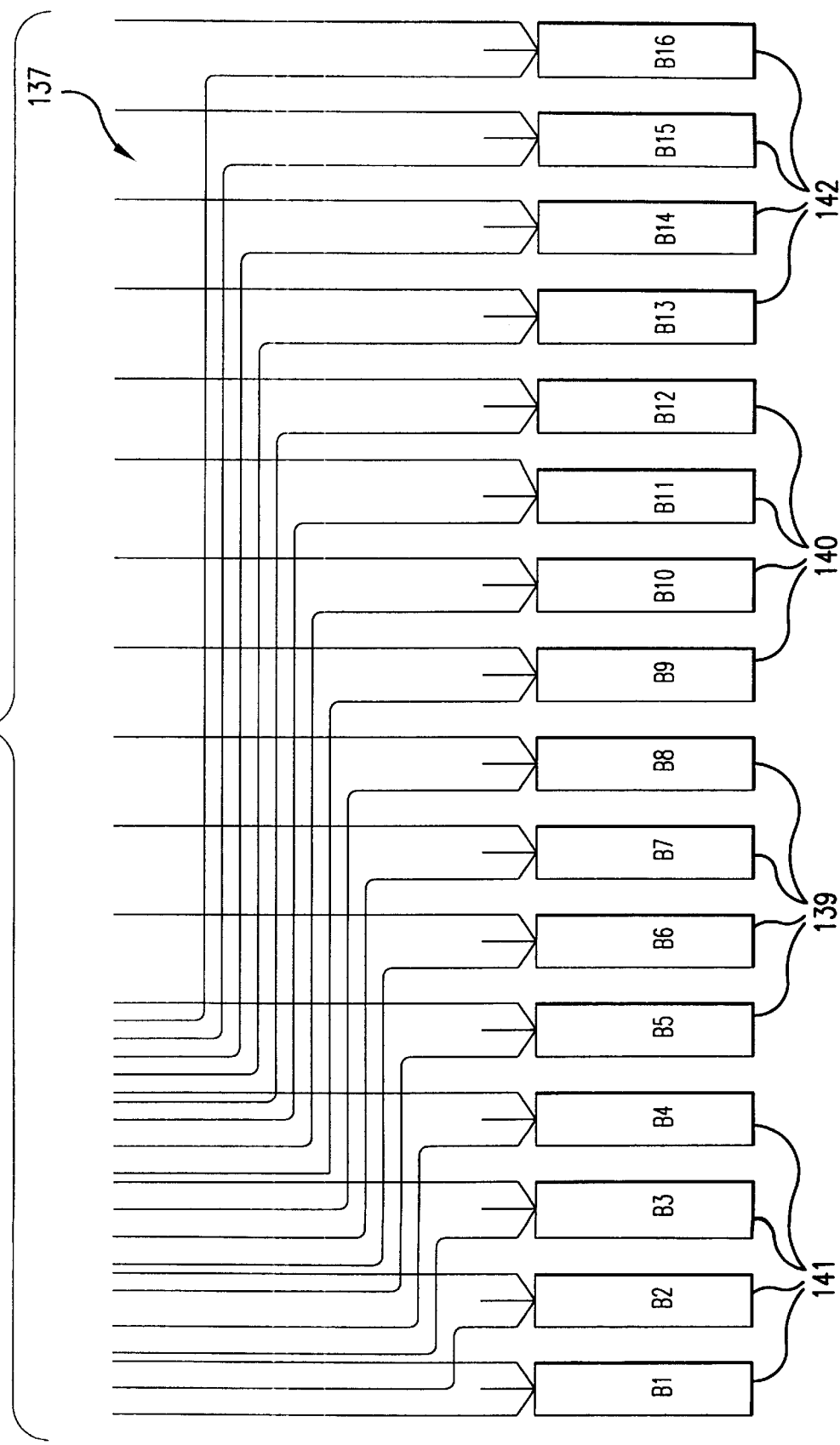

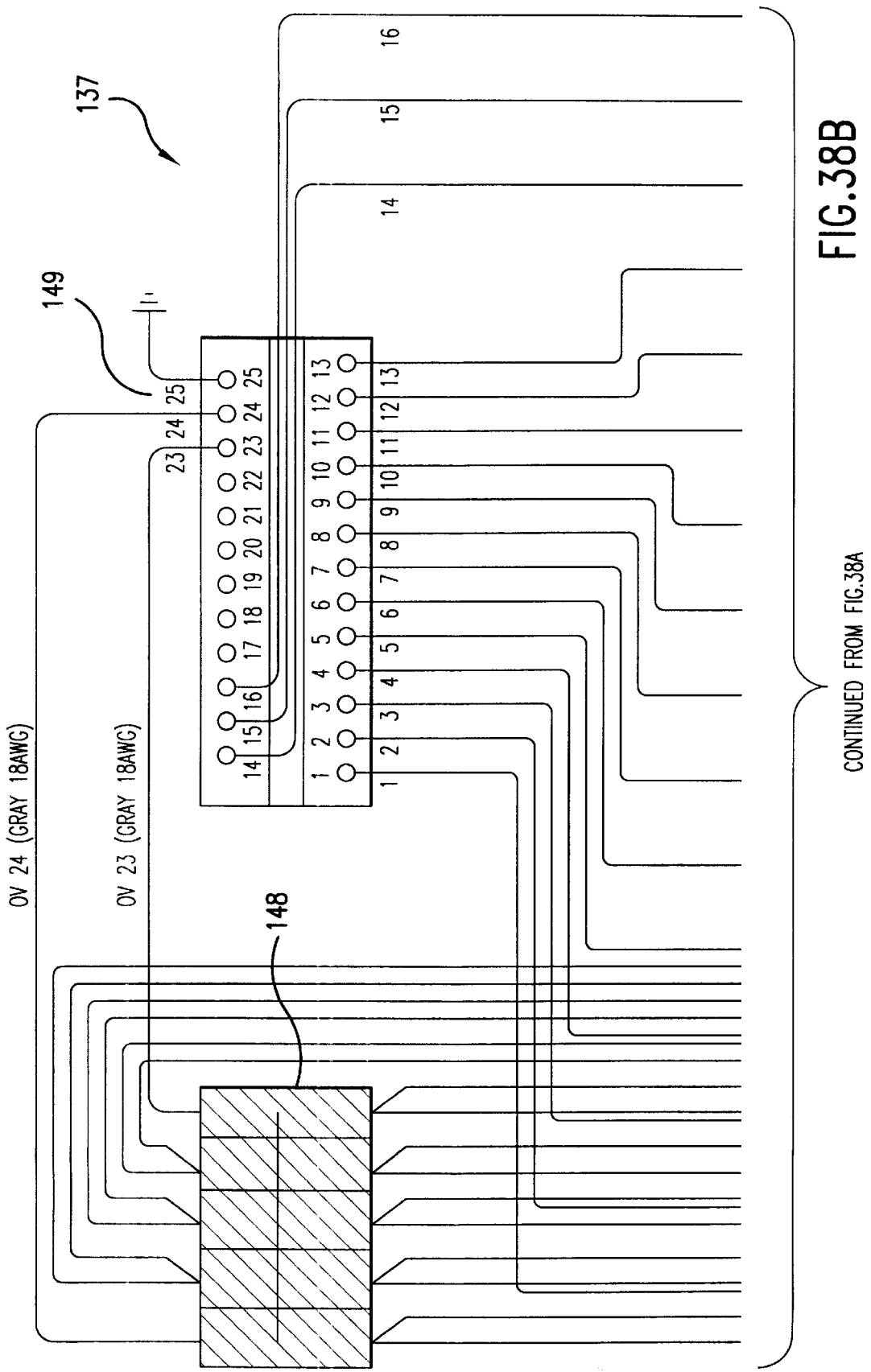

STUDIO LIGHTING SYSTEM

BACKGROUND OF THE INVENTION

1. Field of the Invention

The present invention relates to a studio lighting system, in which light substantially completely envelops an object to be photographed or digitally captured; and more particularly, to a studio lighting system in which multiple zones of lighting are controlled through multiple dimming circuits so as to achieve desired lighting scenes, and more particularly, to a studio lighting system, where a desired lighting scene is recordable and reproducible.

Also, the present invention relates to a studio lighting system which includes independently movable modules, i.e., shooting table, a rear cove, and an overhead wrap-around cove, each carrying dimmable light sources, which in combination thereof, form a lighting envelope surrounding an object to be photographed or digitally captured and positioned on the shooting table, so that a desired lighting scene is obtained.

Furthermore, the present invention relates to a studio lighting system in which each light source has a clear gel holder that covers the entire light source for receiving and holding a colored, neutral density, or opaque gel between the light source and the diffusing material to provide a wide variety of shadings to achieve optimized aesthetic results of photographs or digitally captured images.

2. Prior Art

A wide variety of different studio lighting systems have been developed to provide desired lighting of an object to be photographed. It is common in the art of photography to provide a lighting environment in which light completely surrounds an object to be photographed through a diffusing screen mounted between the light source and the object. For instance, U.S. Pat. No. 5,077,640 discloses a photographic lighting apparatus which includes a light box having an outer wall and an inner wall which comprises a cylindrical diffusing screen surrounding the object to be photographed. The outer wall is octagonal in shape, with light sources installed in each of the facets of the octagonal outer wall. The light box is generally horizontally disposed and held by cables. The object to be photographed is supported on a shooting table centrally of the circular inner wall. Each light source is variable in intensity so the light level around the diffusing screen can be varied. Each of the cables the light box is carried on, is individually adjustable so the height and the attitude of the light box can be varied.

Another lighting system is disclosed in U.S. Pat. No. 5,012,396. This lighting system includes a box-like housing which has an open side which is closed by a frosted diffusion lens and a reflector mounted interiorly of the housing. This reflector is a rigid structural member that includes a curved rear wall having corrugations which define pockets for receiving the fluorescent tubes that are used in the system as the light sources. A retainer plate is disposed between the fluorescent tubes and the diffusion lens. Attached to the reflector is an appropriate number of ballasts that contain electronics to generate high-speed fluorescent lighting.

Although the above-discussed Patents disclose concave holders for light sources providing light to envelop, at least partially, the object to be photographed or observed, it is difficult to reproduce a lighting pattern created for an object to be photographed several times.

A prior art lighting system is disclosed in U.S. Pat. No. 5,481,439, which makes it possible to reproduce a lighting condition practically limitless number of times, thereby shortening photographic time and allowing for less experienced photographers to create reasonable quality photographs. The prior art lighting equipment of this reference includes a frame, one top lighting fixture provided on the upper side of the frame, and two lower lighting fixtures provided on both sides of the frames. These lighting fixtures irradiate an object placed on the top side of the frame, from the upper side and both sides thereof. Ideal locations of the light fixtures may be determined for mimic subjects of various characteristics by a skilled photographer. The location and illumination data obtained are then stored in computer memory. When an actual object is placed in the same position as the mimic subject for photographing, data for a mimic subject having characteristics closest to the actual object are selected from the computer memory, and the light fixtures are automatically oriented accordingly in response to some type of computer control. The light fixtures are mounted on holding members which extend from the top side of the frame length and the position is telescopically and pivotally adjustable. In such a system, the lighting fixtures are reversibly slidable. Despite a certain contribution into the art of photography, the discussed prior art lighting system constitutes a somewhat complicated and inconvenient apparatus for adjusting the position of three lighting fixtures and is not usable when a higher number of light sources are needed for lighting an object to be photographed. Additionally, as it is readily appreciated by those skilled in the art, this prior art system lacks uniformity in lighting an object to be photographed.

A lighting control system which operates to control multiple zones of lighting through multiple dimming circuits so as to achieve a desired lighting scene is disclosed in U.S. Pat. No. 5,530,322. The present system includes a plurality of control units which collectively operate to multiplex digital lighting control information on a communications link. Each control unit includes a plurality of zone intensity actuators which are manipulatable to vary the lighting intensity of an associated lighting zone. A central lighting control panel includes a processor which is programmed to assign a preselected dimming circuit to any one of the zone intensity actuators when that particular actuator is manipulated according to a predetermined sequence. The system disclosed in this Patent, although disclosing the control of the luminous output from a large number of lighting fixtures grouped together in some manner to define various zones of light, fails, however, to suggest structures holding these dimming light sources, which would provide light enveloping an object to be photographed.

None of the prior art lighting systems discussed in the previous paragraphs disclose a lighting system providing for enveloping of an object to be photographed, i.e., front and side of the object, background under the object, tops of the object, upper portion of the background, accomplished by independently movable and interpositionable modules, i.e., shooting table, rear cove and an overhead wrap-around cove, each carrying dimmable light sources in predetermined interrelationships to provide an optimized aesthetic photographic effect.

Furthermore, there was no suggestion in any of the above-discussed systems that a photographer can "color gel" or block the light sources from behind the diffusing material by the unique arrangement provided by the subject Patent Application system including a clear gel holder that covers the entire light source for placement of any type of colored, neutral density or opaque gel (filter) anywhere over the light source with the exception of underneath the diffusing material.

Also, none of the system discussed above disclose a lighting system which would envelop an object with precisely measurable and repeatable light patterns using the settings on a control panel which carries information on a kind and position of gels (filters) disposed over a light source. Despite the demonstrated benefits of photographic lighting systems of the prior art, such fail to disclose or even suggest the above advantageous features as is provided by the subject Patent Application system, herein described.

SUMMARY OF THE INVENTION

It is, therefore, an object of the present invention to provide a studio lighting system allowing both professional and non-professional photographers to photograph or digitally capture the image of virtually any tabletop object with fingertip control of highlight and directional light density virtually anywhere around the object to be photographed or digitally captured, with precisely reproducible lighting pattern throughout a limitless number of operations.

It is another object of the present invention to provide a studio lighting system where the lighting effect that a photographer creates, can be recorded as visualized, and further used for reproducing the same lighting effect.

It is still an object of the present invention to provide a studio lighting system having independently movable light holding modules, i.e., a shooting table, a rear cove and an overhead wrap-around cove (dome cove), carrying therewithin dimmable light sources in predetermined interrelationship thereof which assume easy multiple positioning for allowing the lights irradiated from the light sources to practically envelop the object to be photographed throughout a great range of camera angles.

It is a further object of the present invention to provide a studio lighting system where each light source contained within the shooting table as well as the rear cove and the dome cove has a clear gel holder that covers the entire light source for placement of any type of colored, neutral density, or opaque gel between the light source and the diffusing material, in order to "color gel" or "block" any light sources, record position and type of gels, and further, when needed, to retrieve the information on the gel in order to duplicate the same results as were achieved in previous lighting patterns.

In accordance with the present invention, a studio lighting system is provided which includes a plurality of dimmable light sources disposed to form a lighting envelope surrounding an object to be photographed. The light sources are positioned within independently positionable light holding modules and extend internally therewithin. The light holding modules include a tiltable shooting table underlying the object to be photographed, a rear cove, and a dome cove wrapping around the shooting table. The shooting table, the rear cove, and the dome cove are mounted on a carrying frame, which in its turn, moves on wheels, attached to the bottom of the carrying frame, so that the whole structure can be rolled around a studio and stably secured in a predetermined location when desired.

The light sources, which may include fluorescent lamps, are mounted within the shooting table, the rear cove, and the dome cove, and extend internally therewithin in spaced apart arrangement thereof, substantially in parallel to front and rear ends of the shooting table, in parallel to the upper and lower ends of the rear cove, and in parallel to side edges of the dome cove.

At least one, but preferably two or three, light sources are mounted on a lamp supporting unit, a plurality of which extend within each of the light holding modules.

It is essential that a gel holder, which has a tube-like, preferably semi-cylindrical body, is attached to each lamp supporting unit and covers the light sources supported by each said lamp supporting unit throughout substantially the entire length thereof.

A gel filter, of any type, including colored, neutral density, or opaque gel, may be removably disposed within at least one gel holder, in order to "color gel" or "block" any light sources. It is of particular importance that the type and position of the gel filters can be recorded in a system for further reproduction of the created lighting scene.

Preferably, a control panel has a plurality of actuators each electronically associated with a respective light source, so that by manipulating the actuator, the intensity level of each light source may be adjusted.

A desired lighting pattern may be created for an object to be photographed and positioned on the top of the shooting table, which is characterized by intensity level of the light sources within the shooting table, the rear cove, and the dome cove, and also by the type and the position of a gel filter, or gel filters, used in the studio lighting system. The intensity levels of the light sources, the position and the type of the gel filters used, are recorded in computer memory for further reproducibility when needed.

The shooting table, the rear cove, and the dome cove move independently of each other and may accept different positions. For example, the shooting table may accept horizontal or tilt positions; the rear cove may be in the lower, upper or intermediate positions; and the dome cove may accept a normal (or horizontal) position and an upper (or lifted) position. Change of position of the shooting table, rear cove, and dome cove are facilitated by supporting members extending between the base of the studio lighting system and the light holding modules, i.e., shooting table, rear cove and dome cove.

Preferably, the base includes a carrying frame which has a pair of spaced apart parallel side beams, a stand (or power cabinet) mounted at the rear end of the side beams and extending upwardly therefrom. The supporting members include first and second spring biased telescopically extending members which are pivotally mounted to the side beams of the carrying frame by their lower ends and to the bottom surface of the shooting table by their upper ends. The supporting members further include a third spring biased telescopically extending members pivotally mounted between the side beams of the carrying frame and the dome cove, and a fourth spring-biased telescopically extending members pivotally mounted between the top of the stand positioned on the base and the rear cove. By positionally locating the supporting members in predetermined locational orientations, the shooting table, the rear cove, and the dome cove can be positioned as desired by a photographer.

Preferably, electrical and electronic circuitry and all wiring associated with the controlling mechanism in the system is located within the stand (or power cabinet).

Another aspect of the present invention directs itself to a process of creating lighting effects or patterns for photography. In accordance with the process, light holding modules, i.e., a shooting table, a rear cove, and a dome cove are provided which carry a plurality of light sources internally therewithin disposed in parallel and spaced apart arrangement thereof. Preferably, each light source is covered by a gel holder, and a gel filter which is removably inserted between the light source and the gel holder associated therewith.

A photographer places an object to be photographed on the top of the shooting table, positions the shooting table, the rear cove and the dome cove as desired, and by means of positioning or manipulating a plurality of actuators on the control panel, adjusts intensity levels of the light sources.

By inserting a desired type of a gel filter in the desired position within the shooting table, rear cove or dome cove, the photographer "colors" or "blocks" any light sources desired to provide particular coloring as shading effects.

When the desired lighting pattern is crated, the intensity levels of the light sources used, types and positions of the gel filters are recorded within the memory, so that this lighting pattern can be reproducible a limitless number of times when needed.

These and other novel features and advantages of this invention will be fully understood from the following detailed description and the accompanying drawings.

BRIEF DESCRIPTION OF THE DRAWINGS

FIG. 38 is a diagram of a dimmer wiring of the ballast box; and,

DETAILED DESCRIPTION OF THE PREFERRED EMBODIMENTS

Figure 1:
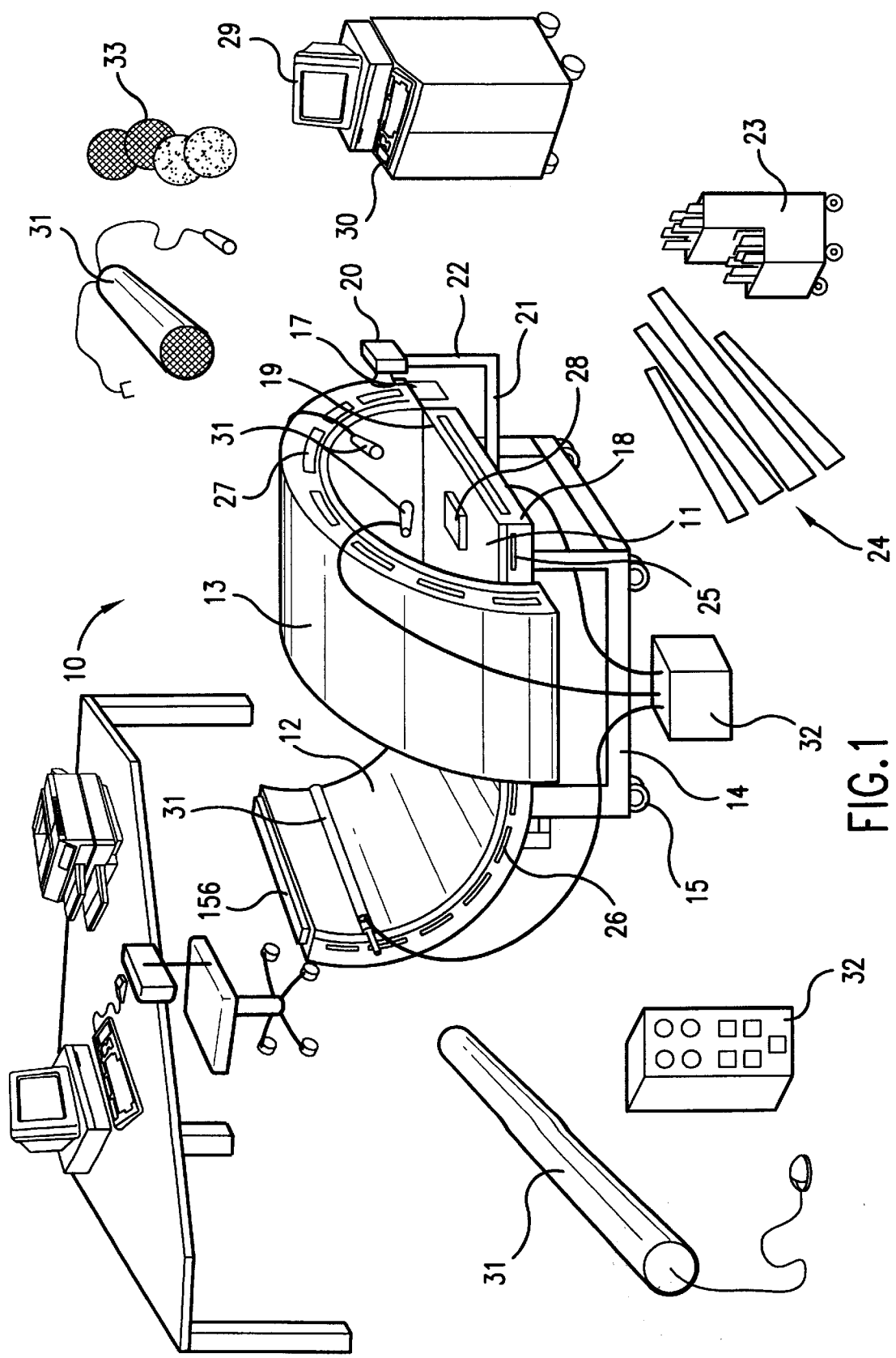
FIG. 1 is a perspective pictorial view of the studio lighting system of the present invention shown in working environment.

Referring to FIGS. 1–8, a studio lighting system 10 of the present invention includes three light holding modules, particularly, a tiltable shooting table 11, a rear cove 12, a dome cove 13, all mounted on a base 14 which may be wheeled around the studio on wheels 15. At least one wheel 15 has a locking mechanism associated therewith to stably position the lighting system in place. Each of the shooting table 11, rear cove 12, and dome cove 13 holds a plurality of dimmable light sources 16, which may be fluorescent lamps, having adjustable level of intensity. A lighting control system, which includes a control panel 17, provides for control, switching ON/OFF and adjusting of the intensity levels of each light source 16 positioned within the shooting table 11, rear cove 12, and the dome cove 13. The control panel 17 is mounted on a front end 18 of the shooting table 11 on a bar 19, extending along the front end 18 of the shooting table 11 as best shown in FIGS. 1, 3, 8, and 21. The control panel 17 can be positioned anywhere along the control handle 19 or alternatively, it may be remotely located. When used remotely, the control panel 17 is electrically coupled through standard cables (not shown in the Drawings) which are supplied along with the studio lighting system 10.

Figure 19:
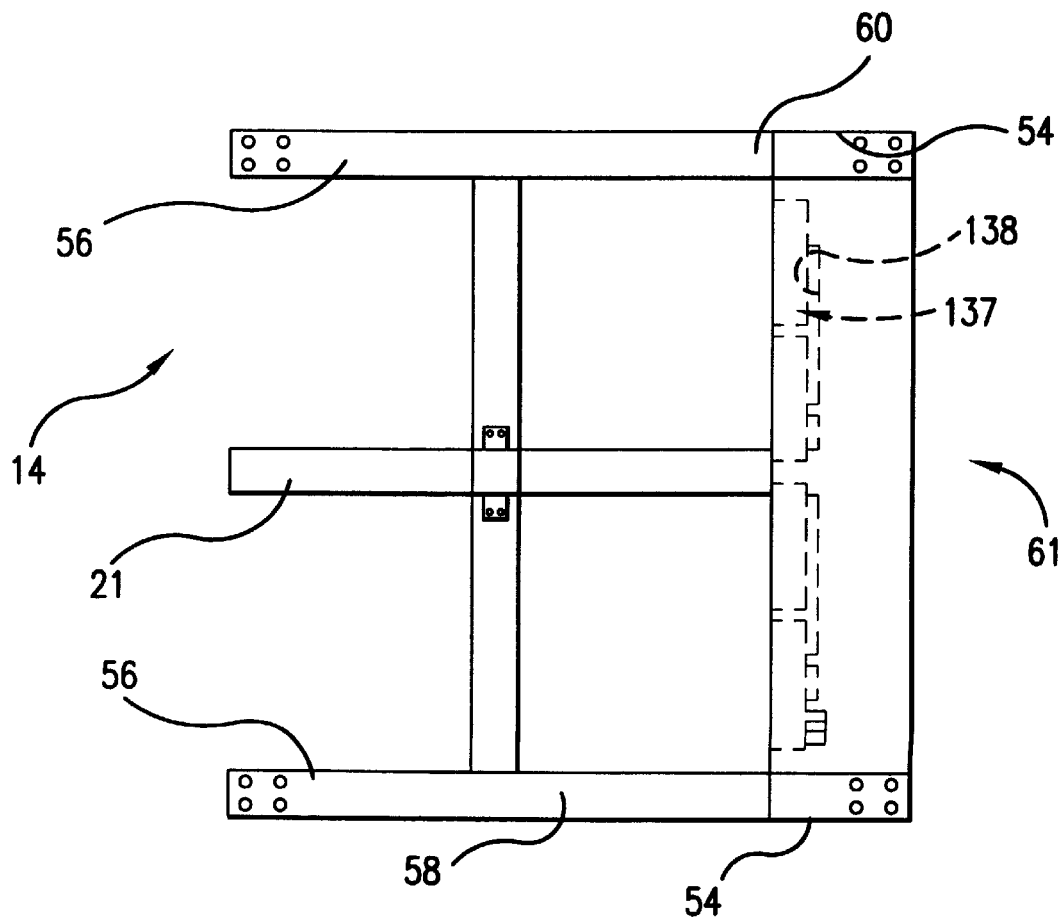
FIG. 19 is a top view of another modification of the base of the studio lighting system of the present invention.
Figure 20:
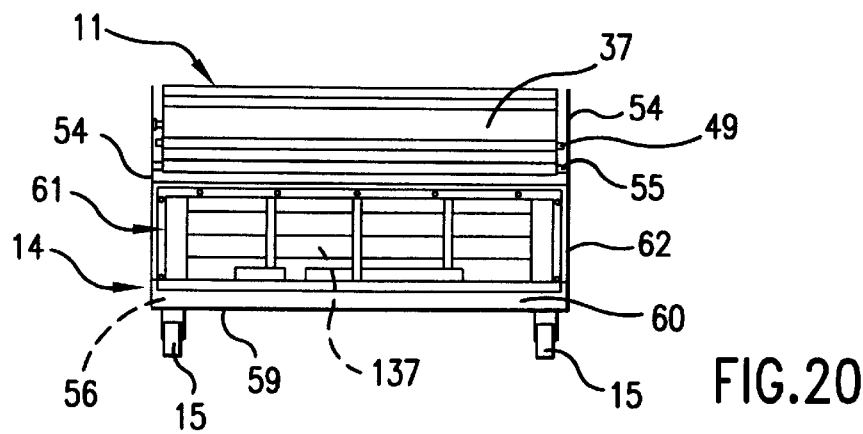
FIG. 20 is a rear view of the shooting table installed on the base of the studio lighting system of the present invention.

Camera 20 may be on a separate stand or may be installed on a supporting beam 21 which extends in a horizontal direction centrally underneath or below the shooting table 11, as best shown in FIGS. 1 and 19. A pole 22 extends vertically from the support beam 21 and supporting the camera 20. The supporting beam 21 may be displaced between the sides of the shooting table 11. The length of the supporting beam 21 extending forward from the front end 18 of the shooting table 11 and the altitude of the beam 21 above the floor can be adjusted to desired lengths and heights depending on the particular photographic operation. The length of the pole 22 is also adjustable, so that the camera 20 is easily movable in these directions. Additionally, the pole 22 may be rotated about a vertical axis as well as a horizontal axis about the supporting beam 21, to accept any angular position with respect to the vertical axis. Thus, the camera 20 is rotatable in a horizontal plane, so that a photographer may position the camera 20 as needed for taking a picture.

A cabinet 23 containing a plurality of gels 24 is provided for holding a plurality of colored, neutral density, or opaque gels, preferably pre-cut to a predetermined length. Gels 24 are insertable into the openings 25 at the sides of the shooting table 11, and/or openings 26 at the sides of the rear cove 12, and/or openings 27 on the front and rear portions of the dome cove 13. Gels 24, "color gel" or "block" the light irradiated from the light sources 16 towards an object 28 to be photographed, as will be described in following paragraphs.

A computer 29 is provided having a memory for storing positions and types of gels 24 used for creation of a desired lighting scene. Computer 29 also stores intensity levels of the light sources 16 established through the control panel 17, and for retrieving data adequate to the desired lighting scene for reproduction when needed in further picture taking. The type and position of the gels 24 as well as the position and intensity level of the light sources 16 are introduced into the memory of the computer 29 via a keyboard 30. Further, the desired intensity levels of light sources 16 may be transmitted into the memory of the computer 29 directly from the control panel 17.

Optionally, additional light accessories 31 may be used with the lighting system of the present invention powered from a power source 32. As shown in FIG. 1, additional lights 31 may be affixed to the rear cove 12 or the dome cove 13 may be affixed to the rear cove 12 or the dome cover 13 on utility bars, as described in the following paragraphs. A set of colored filters 33 may be provided which are clamped to the additional light accessories 31, as known to those skilled in the art and not intended to be described in detail herein.

Object 28 to be photographed or digitally captured is placed on the top surface 34 of the shooting table 11, and a photographer adjusts the positioning of the rear cove 12, the dome cove 13, and the shooting table 11, inserts into the desired openings 25, 26, and 27, the gels 24 of the needed type, and viewing through the camera 20, simultaneously establishes desired intensity levels of the light sources 16.

During the process of creating a desired lighting scene, the photographer may change the position of the shooting table 11, rear cove 12, and dome cove 13, may insert and remove gels 24, may turn ON/OFF the lighting sources 16, as well as change their intensity levels until the desired lighting scene is achieved. When the lighting pattern is obtained, the object 28 is photographed or digitally captured. The photographer then records the position and type of the gels 24 used, and the intensity levels of the light sources 16 into the memory of the computer 29 for further reproduction of the data as needed.

Figure 2:
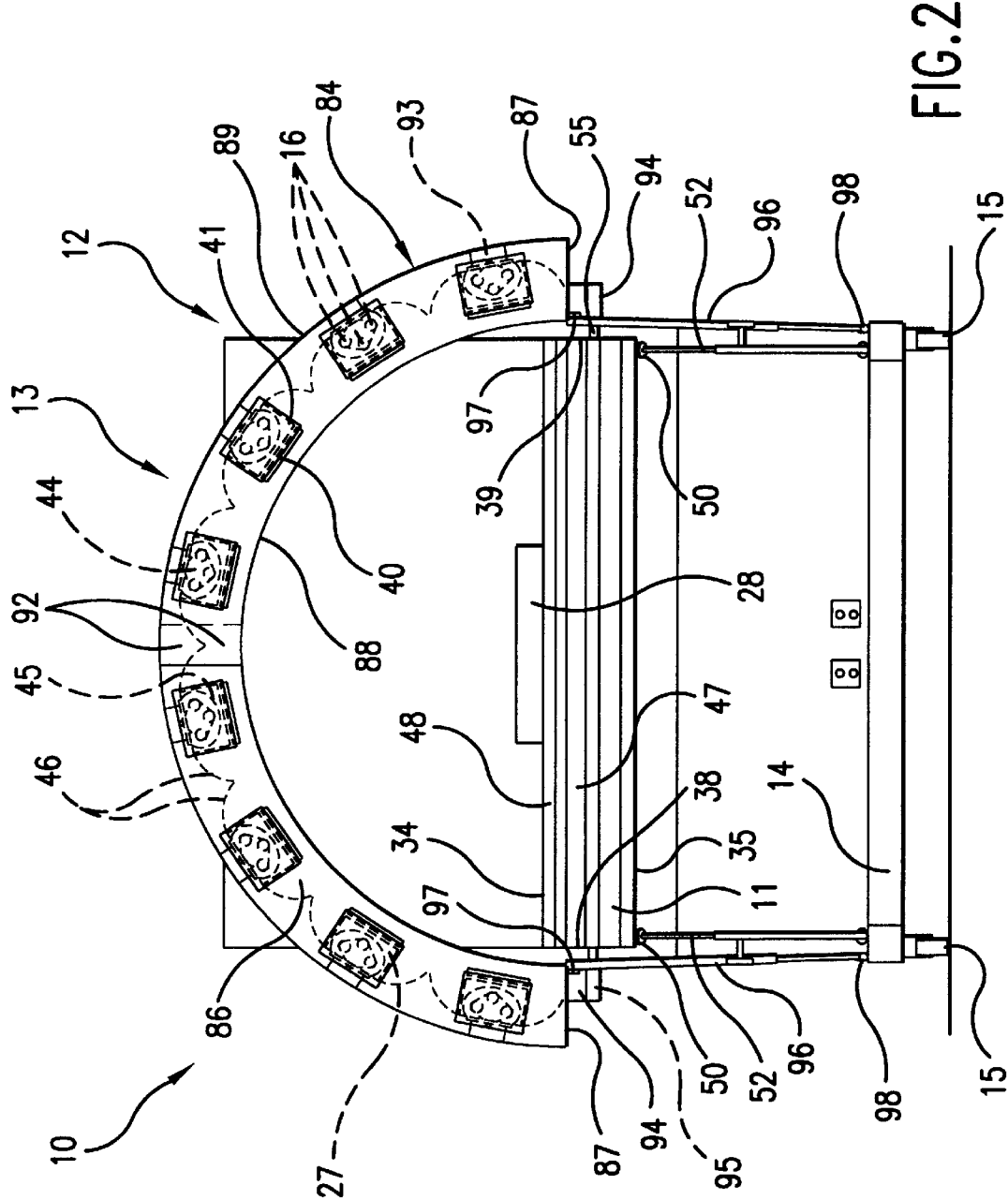
FIG. 2 is a front view of the lighting system of the present invention with the dome cove in the "down" position and shooting table in horizontal position.
Figure 3:
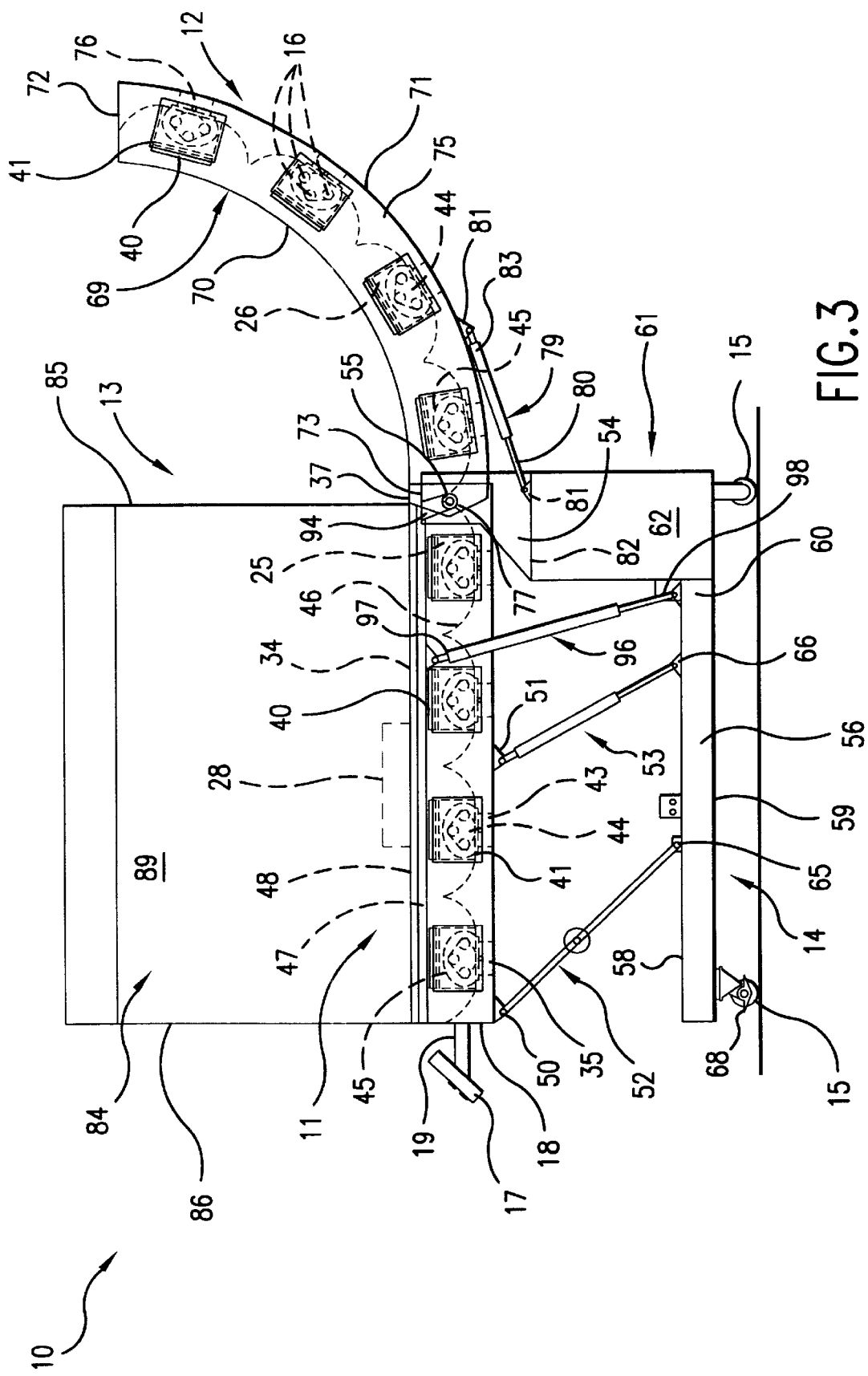
FIG. 3 is a side view of the lighting system of the present invention showing the dome cove in "down" position and the shooting table in the "up" (horizontal) position.
Figure 4:
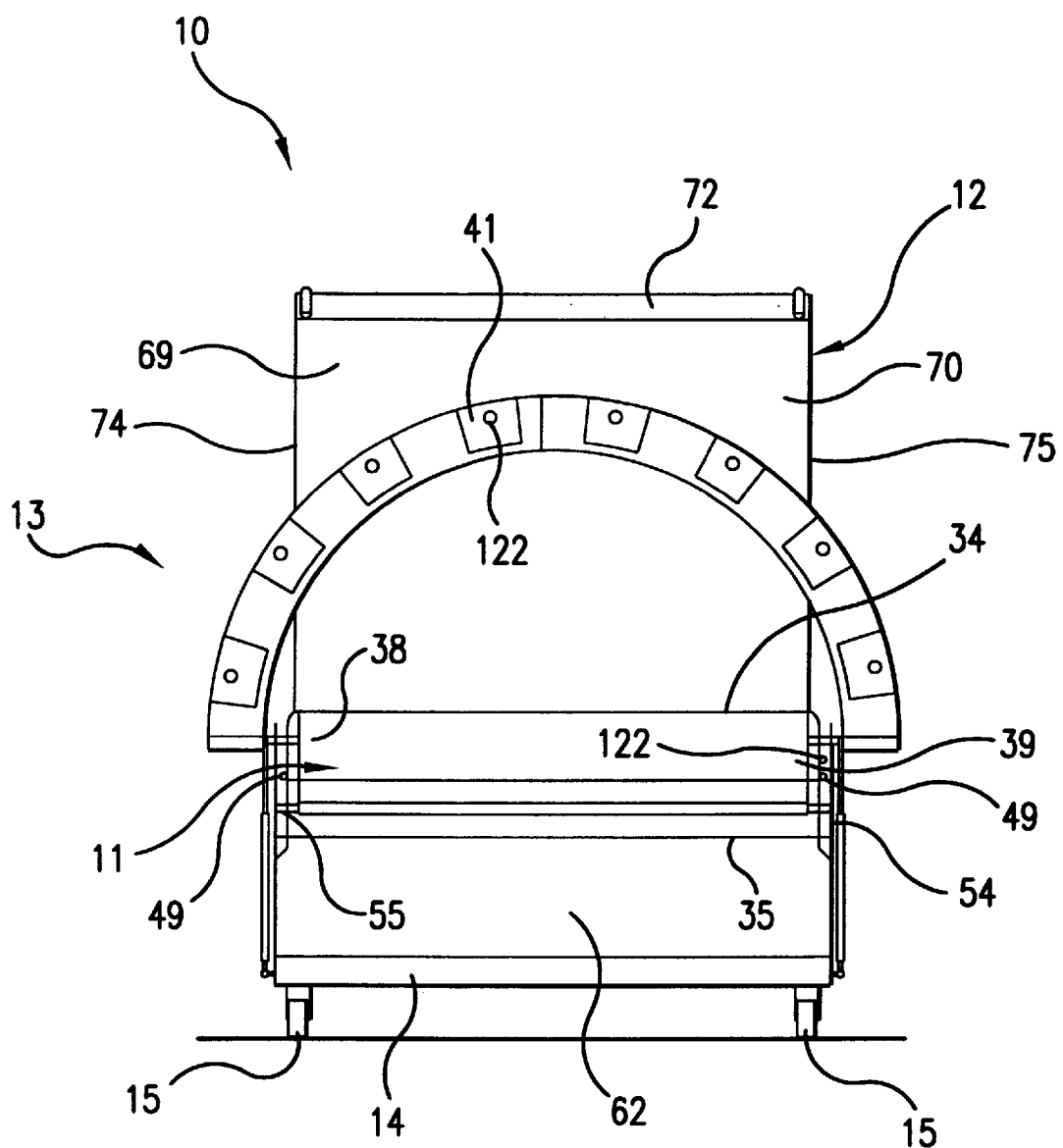
FIG. 4 is a front view of the lighting system of the present invention showing the dome cove in its "down" position, the shooting table in its "up" position and the rear cove in its "up" position.
Figure 5:
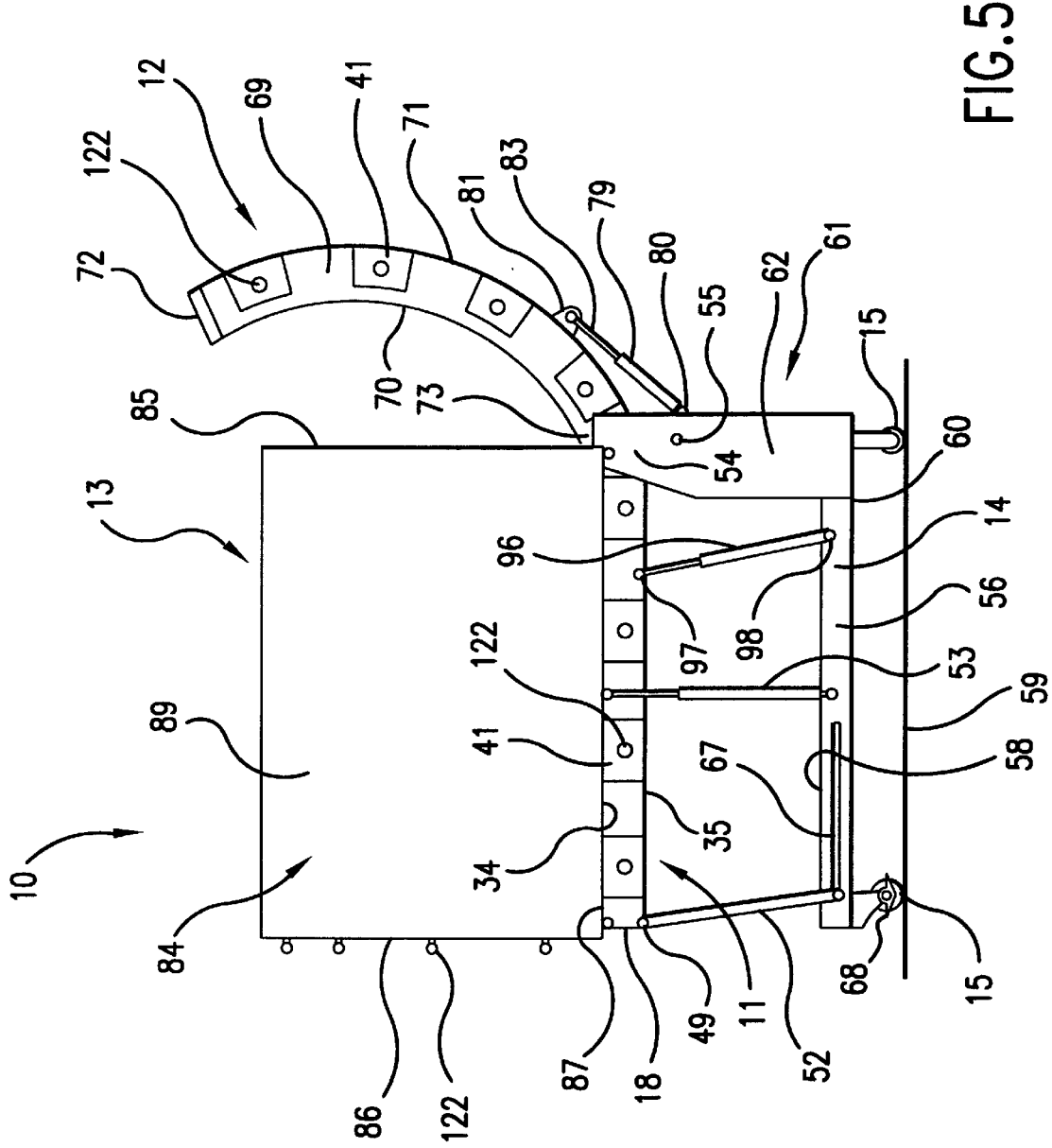
FIG. 5 is a side view showing the lighting system of the present invention with the dome cove in its "down" position, the shooting table and the rear cove in their "up" position.

As shown in FIGS. 2–8, the light holding modules, i.e., shooting table 11, rear cove 12, and dome cove 13 may independently accept different positions. For example, as shown in FIGS. 2 and 3, the dome cove is in the "down" position, the shooting table 11 is in the "up" or "horizontal" position, and the rear cove is in its "down" position. As shown in FIGS. 4 and 5, the dome cove 13 is in its "down" position, while the shooting table 11 and the rear cove 12 are in their "up" positions. As further shown in FIGS. 6 and 7, the dome cove 13 is in its "up" position, and the shooting table 11 and rear cove 12 are in the "down" position.

With respect to FIG. 28, discussed in the following paragraphs in detail, the rear cove 12 is shown pivoting between its "down" and "up" positions. Therefore, a photographer is provided with a limitless spectrum of combinations, positions, and shooting angles. By manipulating the light holding modules of the lighting system of the present invention, the photographer is capable of creating a lighting envelope surrounding the object 28 to be photographed from any angle to obtain practically limitless numbers of lighting effects.

The photographer individually manipulates the light holding modules through adjustment of the telescopically extending spring-biased members, which extend between the base 14 of the lighting system 10 of the present invention and the light holding modules, i.e., the shooting table 11, the rear cove 12, and the dome cove 13.

Figure 15:
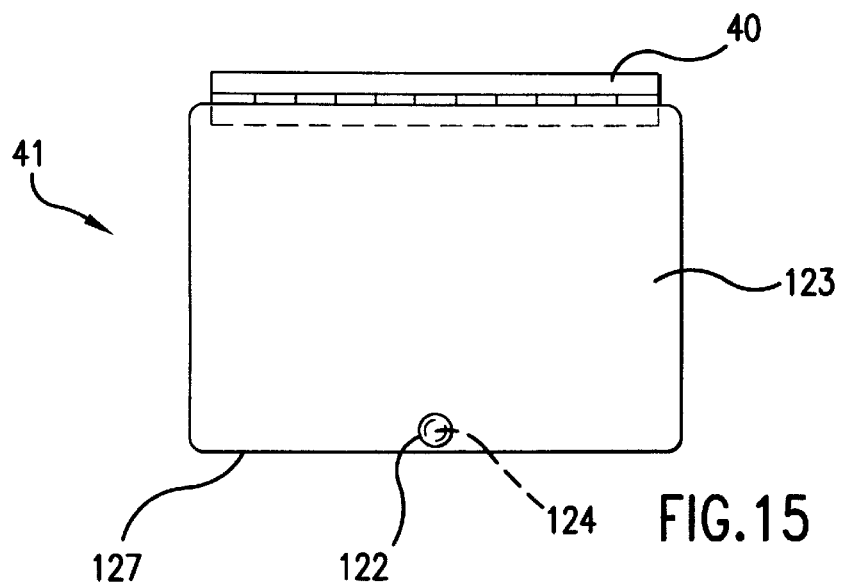
FIG. 15 is a front view of a lamp access cover with a straight edge which is used in the shooting table.
Figure 16:
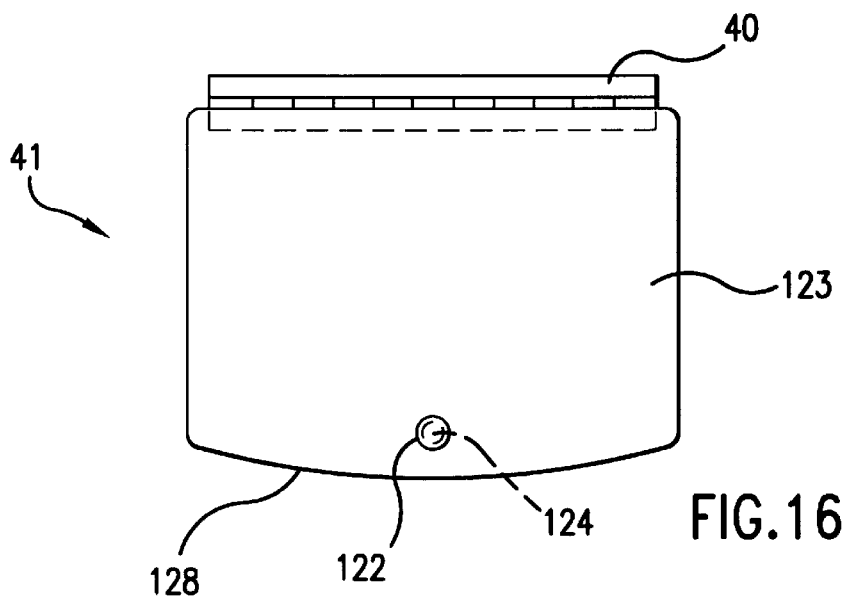
FIG. 16 is a front view of a lamp access cover with a curved edge which is used in the dome cove and the rear cove.
Figure 17:
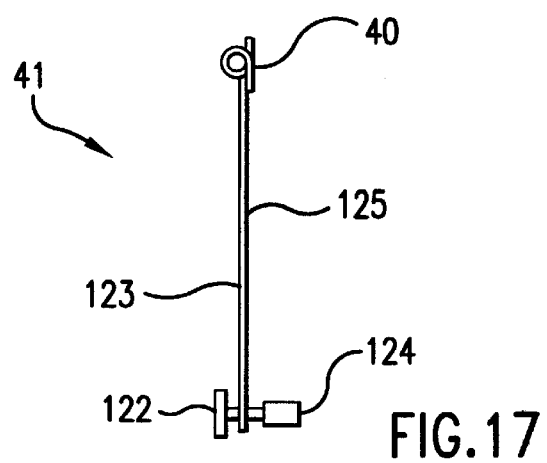
FIG. 17 is a side view of a lamp access cover.
Figure 23:
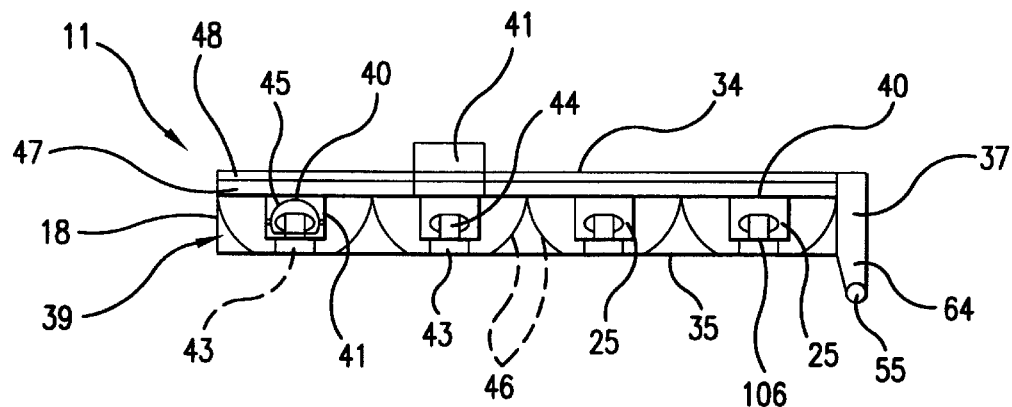
FIG. 23 is a side view of the shooting table of the present invention showing the lamp access covers in their hinged position, open position and removed.
Figure 24:
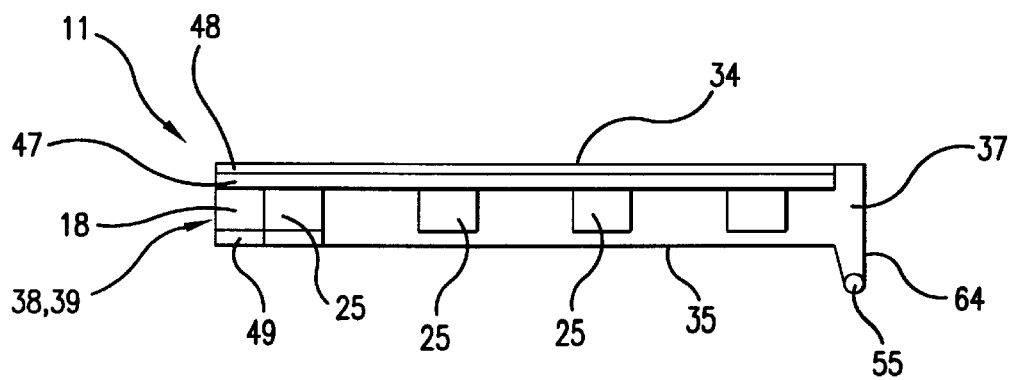
FIG. 24 is a side view of the shooting table of the present invention with lamp access covers removed.

The shooting table 11, shown in FIGS. 1–8 and 20–24, is a tiltable shooting table, having the top 34, on which the object 28 to be photographed is placed, a bottom surface 35, a front end 36, and a rear end 37. Two identical thin plates, made of steel, constitute a pair of side portions 38 and 39 of the shooting table 11, as best shown in FIGS. 23 and 24. Several, in this particular example, four openings 25 are provided on each side portion 38, 39. The upper edge of each opening 25 is provided with a hinge 40 as best shown in FIGS. 15–17, to which a lamp access cover 41 is secured for hingedly closing the openings 25, when needed. FIG. 23 shows the side portion of the shooting table 11, having the left lamp access cover 41 closed, the second from the left lamp access cover 41 opened, and the third and fourth from the left lamp access covers 41 removed.

Figure 8:
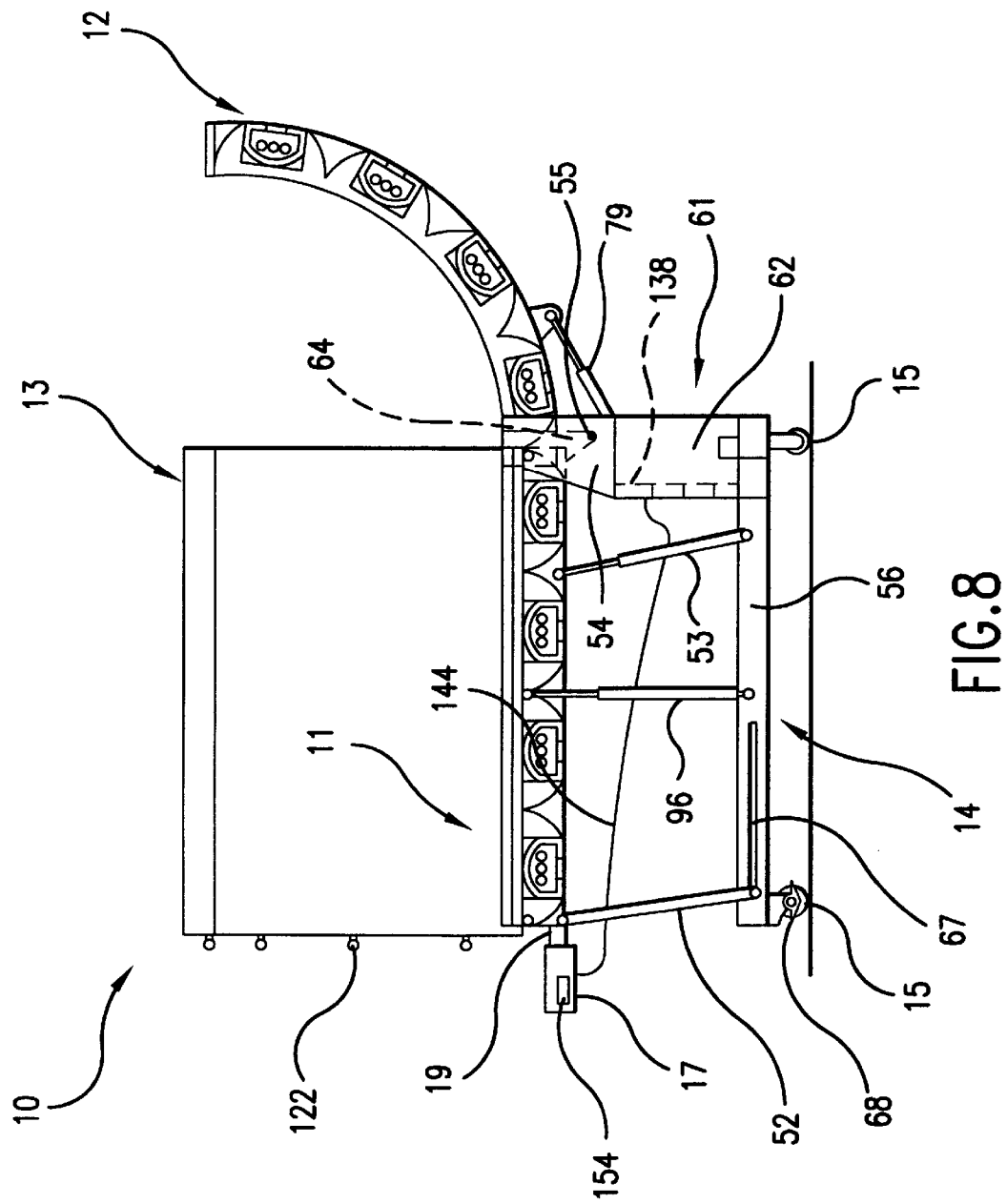
FIG. 8 is a side view of another modification of the lighting system of the present invention.
Figure 21:
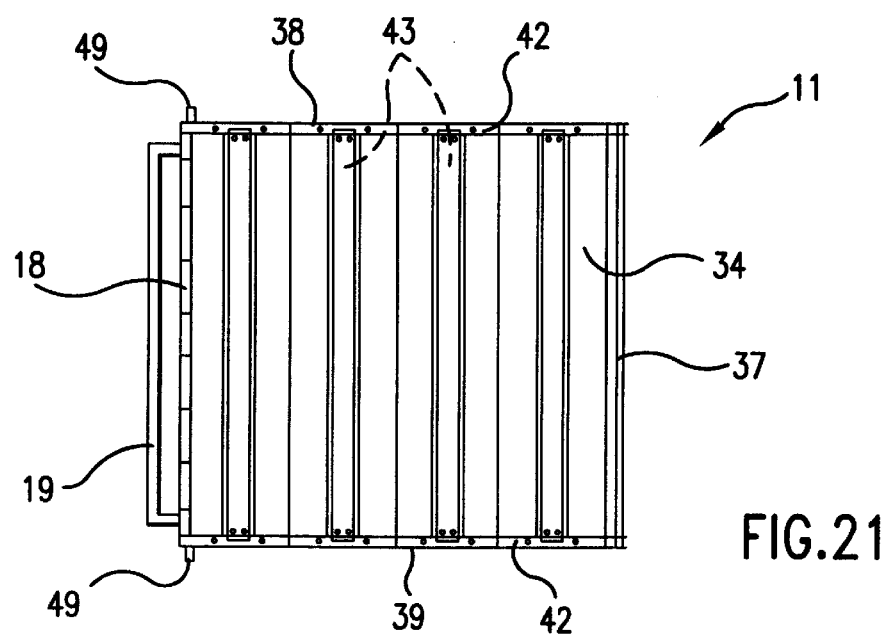
FIGS. 21 and 22 are top and bottom views, respectively, of the shooting table of the present invention.
Figure 22:
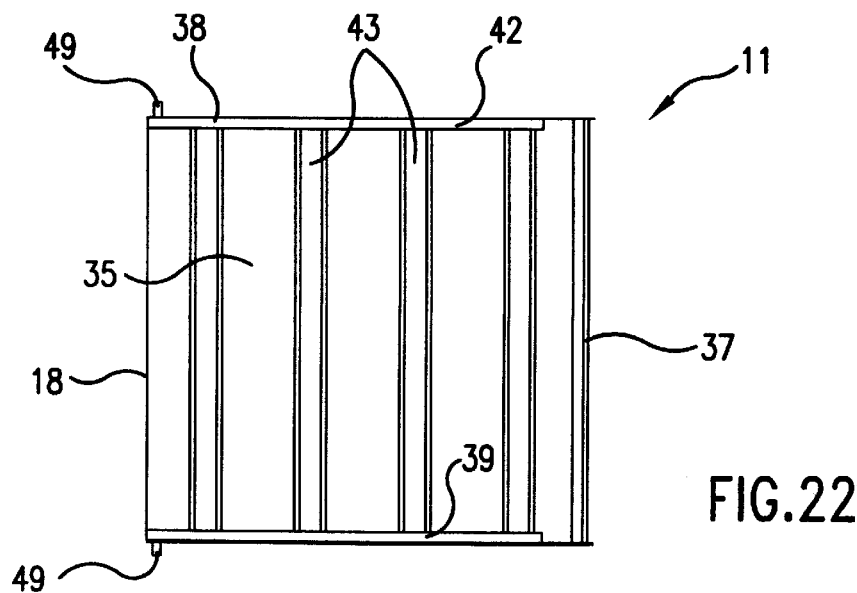

A rim 42, approximately one inch in width, as best shown in FIGS. 21 and 22, extends substantially the whole length of each of the side portions 38 and 39 (along the top and/or bottom thereof) substantially in perpendicular thereto. Several beams 43, the number of which corresponds to the number of openings 25 in each side portion 38, 39, extends between the side portions 38 and 39 the whole width of the shooting table 11. The beams 43 may be coupled to the rims 42 by any fastening means, including fasteners, adhesives, etc., or may be integral with said rims 42. Lamp supporting units 44 and gel holders 45, both discussed in the following paragraphs, are removably secured to the beams 43. FIGS. 21 and 22 show the shooting table 11 with lamp supporting units 44 and the gel holders 45 removed, while FIGS. 3 and 8 show the shooting table 11 with gel holders 45 in place.

Figure 30:
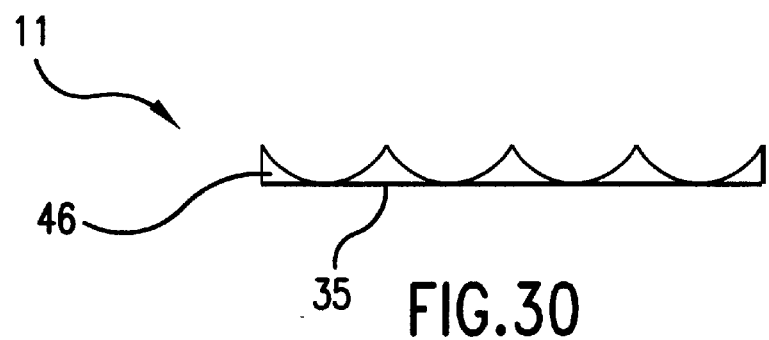
FIG. 30 shows a side view of a reflector section of the shooting table.
Figure 31:
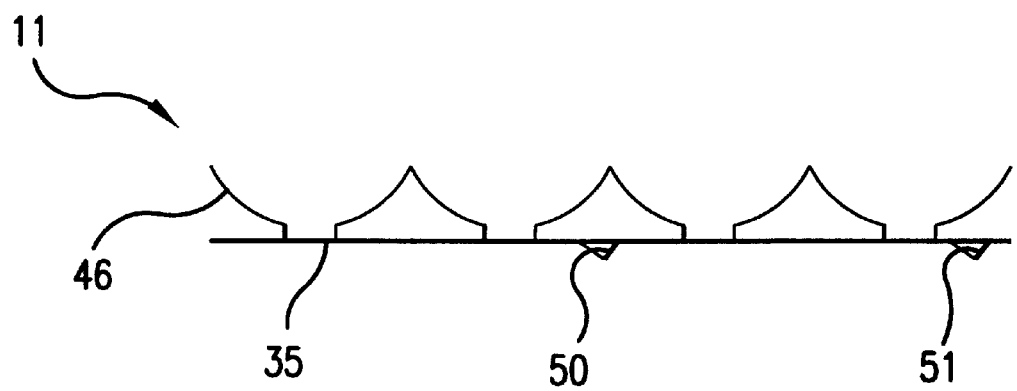
FIG. 31 is a side view of another modification of the reflector section of the shooting table.

The bottom surface 35 of the shooting table 11, as best shown in FIG. 22, is made of thin steel sheet or like material secured to the rims 42 and supporting the reflector section 46 of the lighting system, as best shown in FIGS. 23, 30, and 31. The top surface 34 of the shooting table 11 has a support 47 extending along the perimeter of the shooting table 11, except the rear end 37 thereof which is covered with a layer 48 of a diffusing material. Although a number of well-known diffusing materials may be used in the lighting system 10 of the present invention, in the preferred embodiment, the diffusing material is formed of translucent stearin having a slightly textured finish approximately ¾ in. in thickness.

In one embodiment thereof, shown in FIGS. 5–7, 21 and 22, the shooting table 11 has a pair of studs 49 mounted at the front end 18 of the shooting table 11 which serve as a pivoting point for supporting members supporting the shooting table on the base 14.

In another embodiment, shown in FIGS. 2, 3, and also in FIG. 31, the bottom surface 35 of the shooting table 11 is provided with tabs 50 and 51 to which supporting members 52 and 53 are pivotally secured.

The shooting table 11 is secured to the base 14 with the rear end 37 of the shooting table 11 being pivotable about the pivoting axis 55 with respect to the supporting flanges 54 which vertically extend from the base 14, as best shown in FIGS. 2–8, 19, 20 and 22. By manipulating the supporting members 52 and 53, the shooting table can be tilted approximately 35 degrees from the "horizontal" position when more overhead shooting angles are required.

Figure 18:
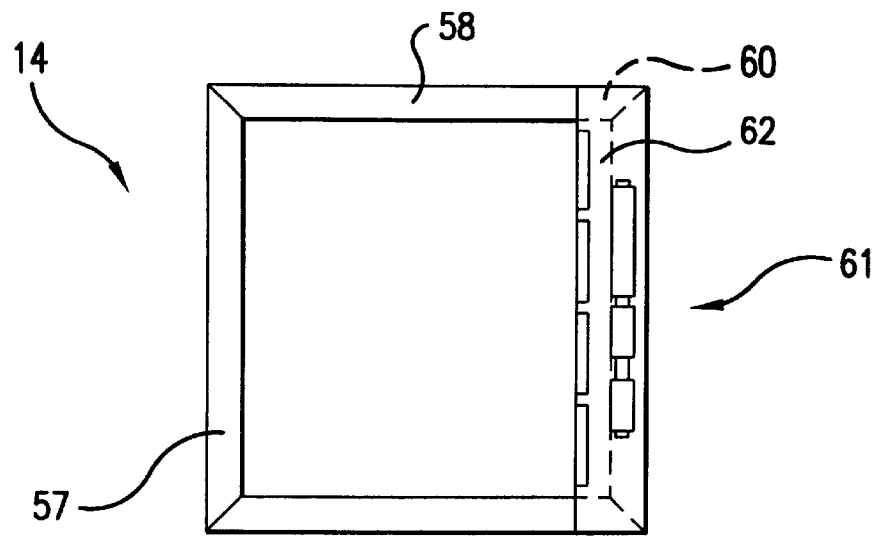
FIG. 18 is a top view of the base of the studio lighting system of the present invention.

The studio lighting system 10 is mounted on the base 14 with the top view of two modifications best shown in FIGS. 18 and 19. The base 14 includes a carrying frame which either has a square-shaped perimeter, as shown in FIG. 18, or alternatively as shown in FIG. 19, has a pair of spaced apart parallel side beams 56 and an intermediate beam, discussed previously as the supporting beam 21 to support camera pole 23. It is readily understandable to those skilled in the art that the supporting beam 21 is spaced from the side beams 56 in vertical direction and extends above the side beams 56. Each side beam 56, or the frame 57, shown in FIG. 18, has a top 58, bottom 59, and rear ends 60. A stand 61 extends upwardly from the top 58 of the side beams 56 or the frame 57 at the rear end 60 thereof.

The stand 61 includes a power cabinet 62, which contains the electrical and electronic blocks used in the lighting system 10, and a pair of vertically extending supporting flanges 54. The supporting flanges 54 have openings aligned to each other, so that a pivoting axis number 55 protrudes through these openings and pivotally secures the rear end 37 of the shooting table 11 to the supporting flanges 54. As shown, for instance in FIG. 3, the shooting table 11 is secured to the supporting flanges 54, at the internal surfaces thereof, with the pivoting axis number 55 protruding through the rear end 37 directly, while as shown in FIG. 8, the pivoting axis member 55 protrudes through a tab 64 extending downward from the bottom surface 35 of the shooting table 11 at the rear end 37 thereof.

Figure 7:
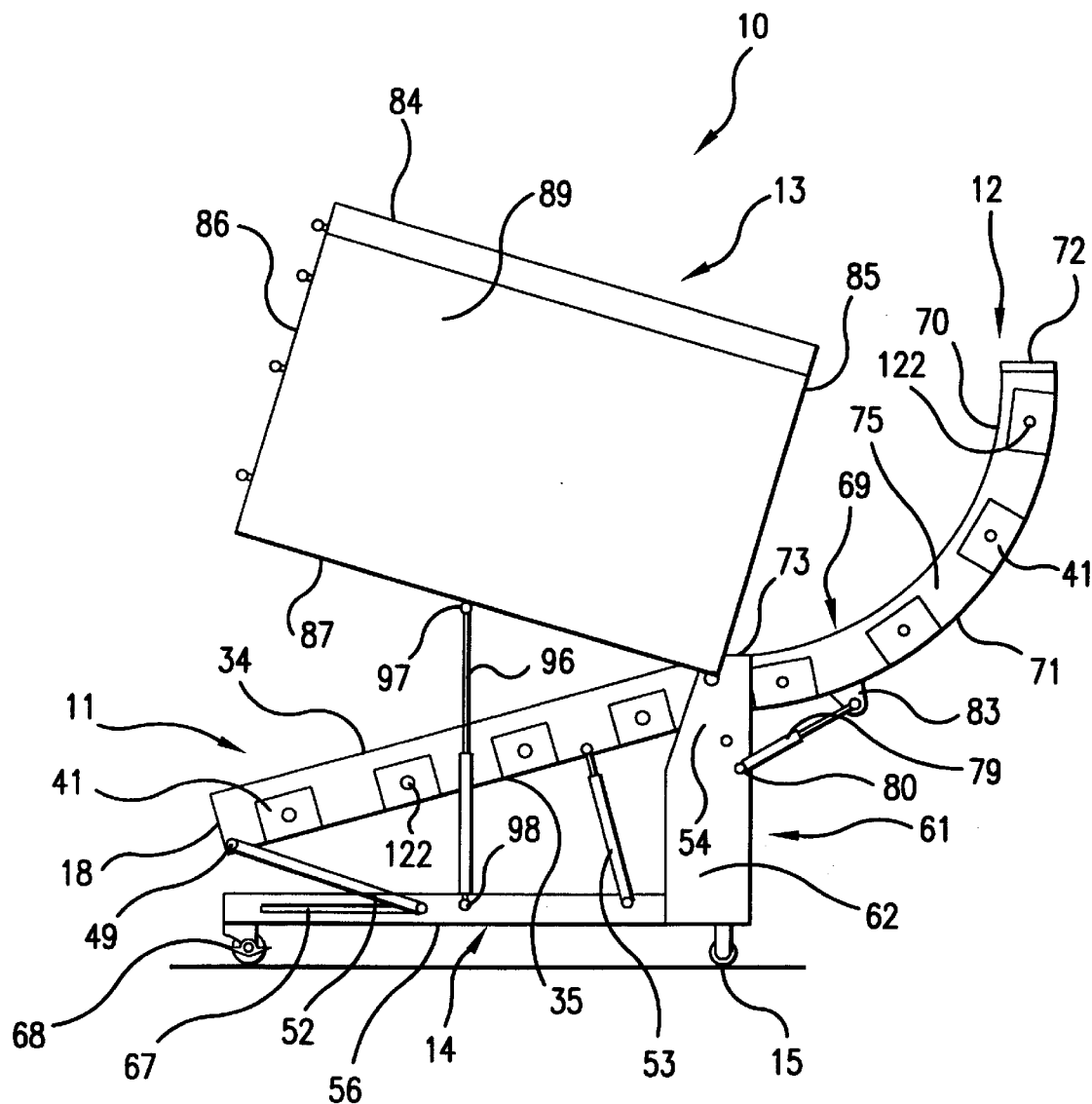
FIG. 7 is a side view of the lighting system of the present invention showing the dome cove in its "up" position, and the shooting table and rear cove in the "down" position.

As shown in FIG. 3, the side beams 56 of the frame 57, have the tabs 65 and 66 of the top 58 for providing a pivoting point for the supporting members 52 and 53. As shown in FIGS. 5, 7 and 8, the side surfaces of the side beams 56 and frame 57 are provided with a slot 67 so that the supporting member 52 may slide therewithin for adjustment of the position of the shooting table 11.

The base 14 is mounted on the wheels 15, as previously discussed, at least one of which has a locking mechanism 68, shown in FIGS. 3, 5, 7, and 8, for stably positioning the studio lighting system 10 at a desired location within the studio. These locking mechanisms are known to those skilled in the art, and any type is contemplated in the scope of the present invention, including heavy duty, lockable casters. The rear cove 12 defining another light holding module of the lighting system 10, as best shown in FIGS. 2–8 and 28–29, has a concave body 69, including an internal surface 70, an external surface 71, an upper end 72 and a lower end 73 pivotally mounted to the supporting flanges 54 at the rear end 37 of the shooting table 11. Two side walls 74 and 75, which may be formed as arched thin plates made of steel or like material, frame the concave body 69 on both sides thereof. Each side wall 74, 75 extends between the upper end 72 and the lower end 73 of the concave body 69. The side walls 74, 75 are provided with the openings 26, four of which are presented on FIGS. 3, 5, 7, 8 and 29 for the purpose of example. Similar to the beams 43 extending through the shooting table 11, four spaced apart beams 76 extend between the side walls 74 and 75, substantially in parallel to each other and to the upper and lower ends 72 and 73, respectively.

The beams 76 of the rear cove 12 may be fastened to the side walls 74, 75 by means of fasteners, adhesives, or may be integral to the side walls 74 and 75. The beams 76 serve to carry lamp supporting units 44 and gel holders 45, as will be described in following paragraphs.

Each opening 26 is provided with a lamp access cover 41 hinged to the side wall 74 or 75 by a hinge 40 at the upper end of the opening 26. The internal surface 70 of the concave body 69 is a diffusing material 157, which may be a translucent stearin having slightly textured finish. Other well-known types of diffusing material are contemplated within the scope of the studio lighting system 10 of the present invention. The external surface 71 of the concave body 69 is preferably made of the same or similar steel composition as the side walls 74 and 75. Reflection sections 46, similar to those carried within the shooting table 11, are built-in within the concave body 69 and secured either to the beams 76 or to the external surface 71 at the inner side thereof. The reflection sections 46 are made of custom bent metal, for example, aluminum, provided for each lamp supporting unit 44 in order to reflect light irradiated from light sources in preferred direction. The reflection sections 46 may be parabolic parallel in cross-section thereof, as shown in FIGS. 3, 8, and 29, or may be linearly shaped in their cross-section, as shown in FIG. 28.

Figure 28:
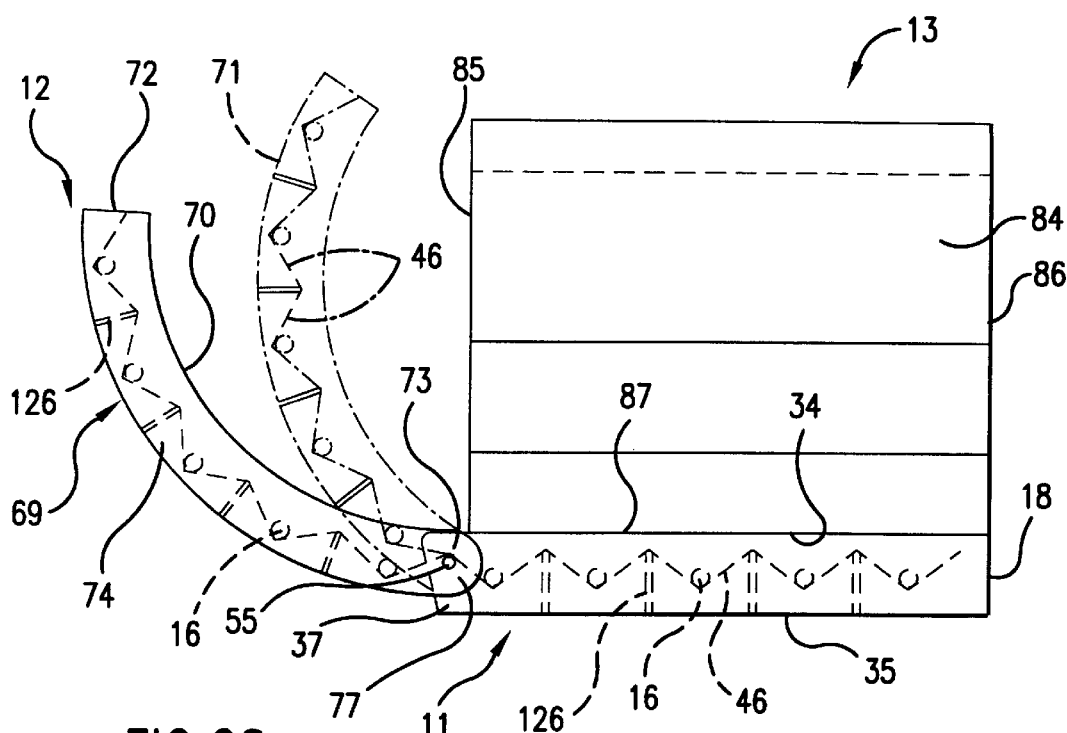
FIG. 28 shows a rear cove positionally connected to the shooting table (the rear cove is shown in two positions thereof)
Figure 29:
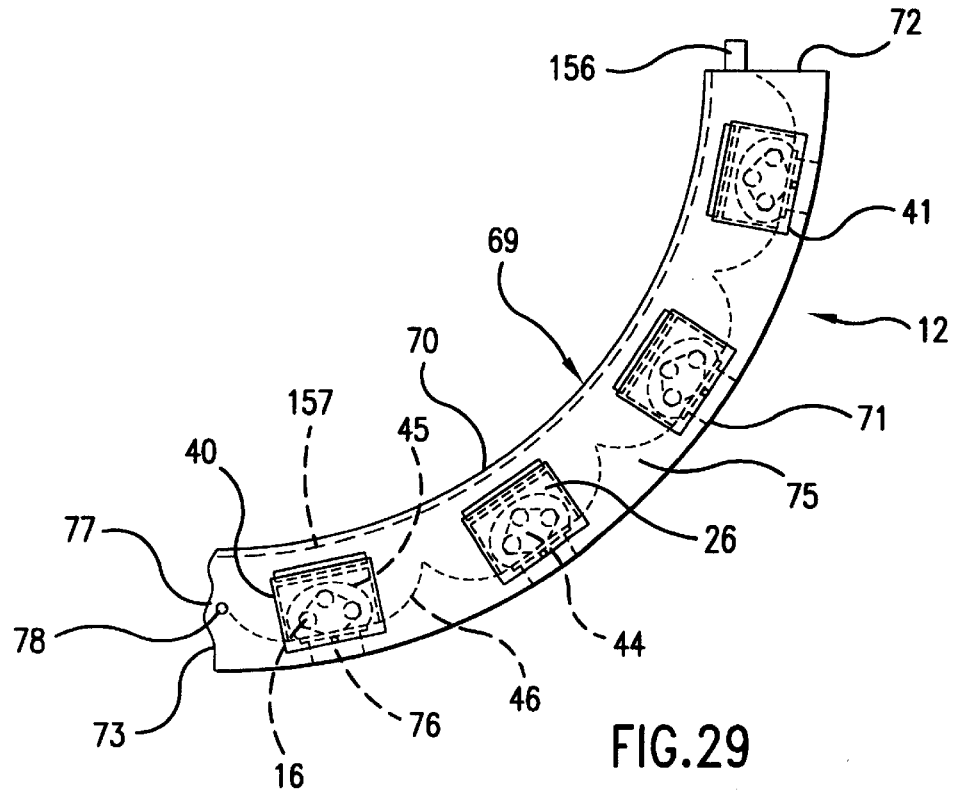
FIG. 29 is a side view of another modification of the rear cove of the present invention.

The lower end 73 of the concave body 69 is provided with tabs 77, which may have different shapes as shown in FIGS. 3, 8, 28, and 29, and have openings 78 on each of the tabs 77 for allowing a pivoting axis member therethrough so that the rear cove 12 may pivot about the pivoting axis between the lower and upper position thereof. The pivoting axis of the rear cove 12 protrudes through both supporting flanges 54 and may co-extend with the pivoting axis member 55 of the shooting table 11, as best shown in FIGS. 2, 3, and 28, or may be spaced from each other as shown in FIG. 8. The tabs 77 of the rear cove 12 may be secured to the supporting flanges 54 from the outside as, for example, shown in FIGS. 3 and 8, or may be secured to the supporting flanges 54 from inside as shown in FIGS. 5 and 7.

FIGS. 3, 5, 7, and 8 show a pair of spring-biased telescopically extending members 79 extending between the stand 61 and the external surface 71 of the rear cove 12. A lower end 80 of the telescopically extending member 79 is pivotally coupled either to the supporting flange 54, as shown for instance in FIGS. 5, 7, and 8, or to a tab 81 provided on the top 82 of the housing 62, as shown in FIG. 3.

The upper end 83 of the telescopically extending member 79 is pivotally secured to a tab 81' on the external surface 71 of the rear cove 12. The telescopically extending member 79 includes a gas spring. When the rear cove 12 is in the "up" position, the telescopically extending member 79 is gas-spring loaded to this position, and as known to those skilled in the art, the use of gas springs allows the rear cove 12, as well as the shooting table 11, and the dome cove 13 to enjoy effortless positioning in any combination thereof.

Due to the relatively simple repositioning of the rear cove 12, such may pivot with respect to the rear end 37 of the shooting table 11, and may be raised up to 30 degrees and secured in any position.

A continuous utility bar 156, shown in FIGS. 1 and 29, may extend the length of the upper end 72 between the side walls 74 and 75 to allow simple clamping of accessories thereto.

The dome cove 13 shown in FIGS. 1–8 and 25–27, has a curved body 84 including a rear portion 85, a front portion 86, and a pair of side edges 87 extending between the front portion 86 and said rear portion 85. The curved body 84 has an inside surface 88 covered with a diffusing material 157 similar to the material covering the internal surface 70 of the rear cove 12, and an outside surface 89 formed of steel or some like composition. The rear and the front portions 85 and 86 constitute two substantially identical arched plates formed of steel or like material and provided with a plurality of openings 27, similar to the openings 25 on the shooting table 11 and the openings 26 on the rear cove 12, eight of which are shown in the Drawings for example purposes. All opening contours are preferably square or parallelepiped shapes. Each of the rear and front portions 85 and 86 are divided into right and left sides 90 and 91 respectively with each having four of the openings 27.

The right and left sides 90, 91 may be secured to each other, as shown in FIG. 2, by overlapping their proximate ends and securing them by fastening means 92 or alternatively may be adhered to each other, or even formed in an integral manner to each other. Each opening 27 is provided with a hinged lamp access cover 41 hinged at the lower end of the opening 27, in contrast to the disposition of the hinge 40 at the upper end of the openings 25 (shooting table) and 26 (rear cove).

Beams 93, similar to the beams 76 of the rear cove 12 and to the beams 43 of the shooting table 11, extend within the curved body 84 in parallel and spaced apart relation between the rear portion 85 and the front portion 86 and substantially in parallel to the side edges 87 of the curved body 84. These beams 93, similar to those in the rear cove 12 and the shooting table 11, may be fastened to the rear portion 85 and the front portion 86, adhered thereto or integral therewith.

Figure 25:
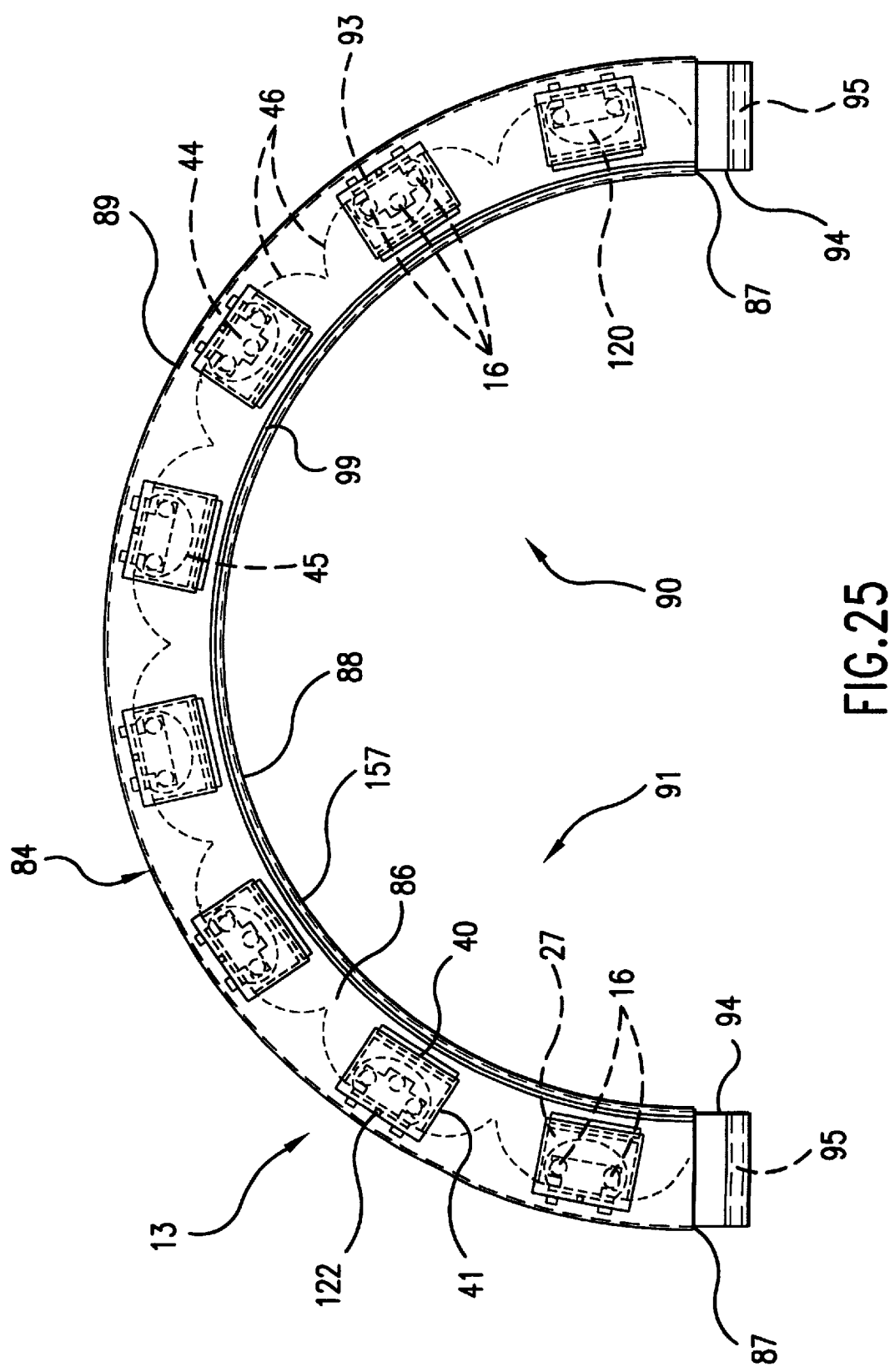
FIG. 25 shows on a somewhat enlarged scale a front view of the dome cove of the present invention.
Figure 26:
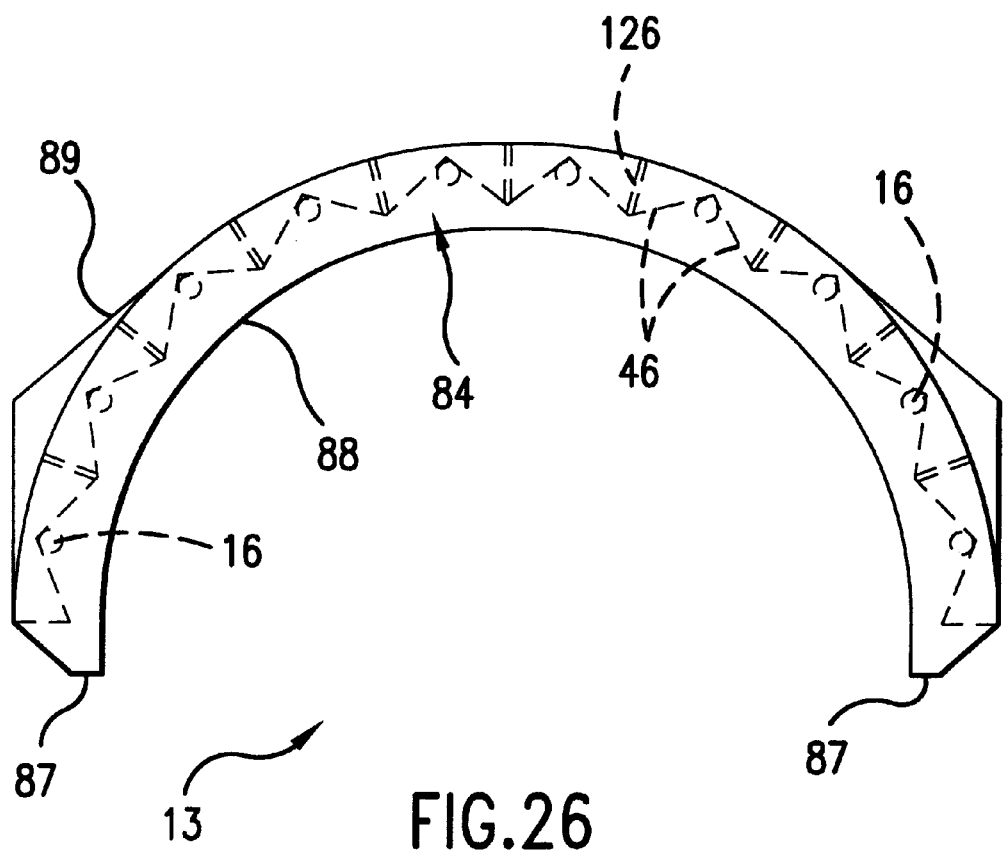
FIG. 26 is a front view of another embodiment of the dome cove of the present invention.

The beams 93 serve for supporting the lamp supporting units 44 and for holding the gel holders 45 removably mounted thereto. Eight reflection sections 46, as shown for example purposes in FIGS. 2, 25, and 26, are secured either to the beams 93 or to the outside surface 89 (from inner side thereof) of the dome cove 13. The reflection sections 46 may be parabolically shaped in cross-section as shown in FIGS. 2 and 25, or may be linearly shaped as shown in FIG. 26.

The dome cove 13 is mounted on the base 14 of the lighting system 10 with the rear portion 85 thereof pivotable with respect to the supporting flanges 54 and with both side edges 87 supported by supporting members 96. As best shown in FIGS. 2, 3, 25, and 27, the dome cove 13 is provided with lips 94 extending downward from the rear portion 85, each provided with the opening 95. A pivoting member axis which preferably co-extends with the pivoting axis member 55 as shown in FIGS. 2 and 3, protrudes through both openings 95 so that the dome cove 13 is pivotally secured to the supporting flanges 54 with the rear portion 85 thereof pivoting with respect to the rear end 37 of the shooting table 11 and pivotal with respect to the lower end 73 of the rear cove 12.

A pair of spring-biased telescopically extended members 96 are provided for repositioning the dome cove 13 as needed. An upper end 97 of each of the spring-biased telescopically extended members 96 is pivotally secured to the side edges 87 of the dome cove 13, while lower end 98 of the spring-biased telescopically extended members 96 is pivotally secured to the side beams 56 or the frame 57 of the base 14, as best shown in FIGS. 2 and 3.

Figure 6:
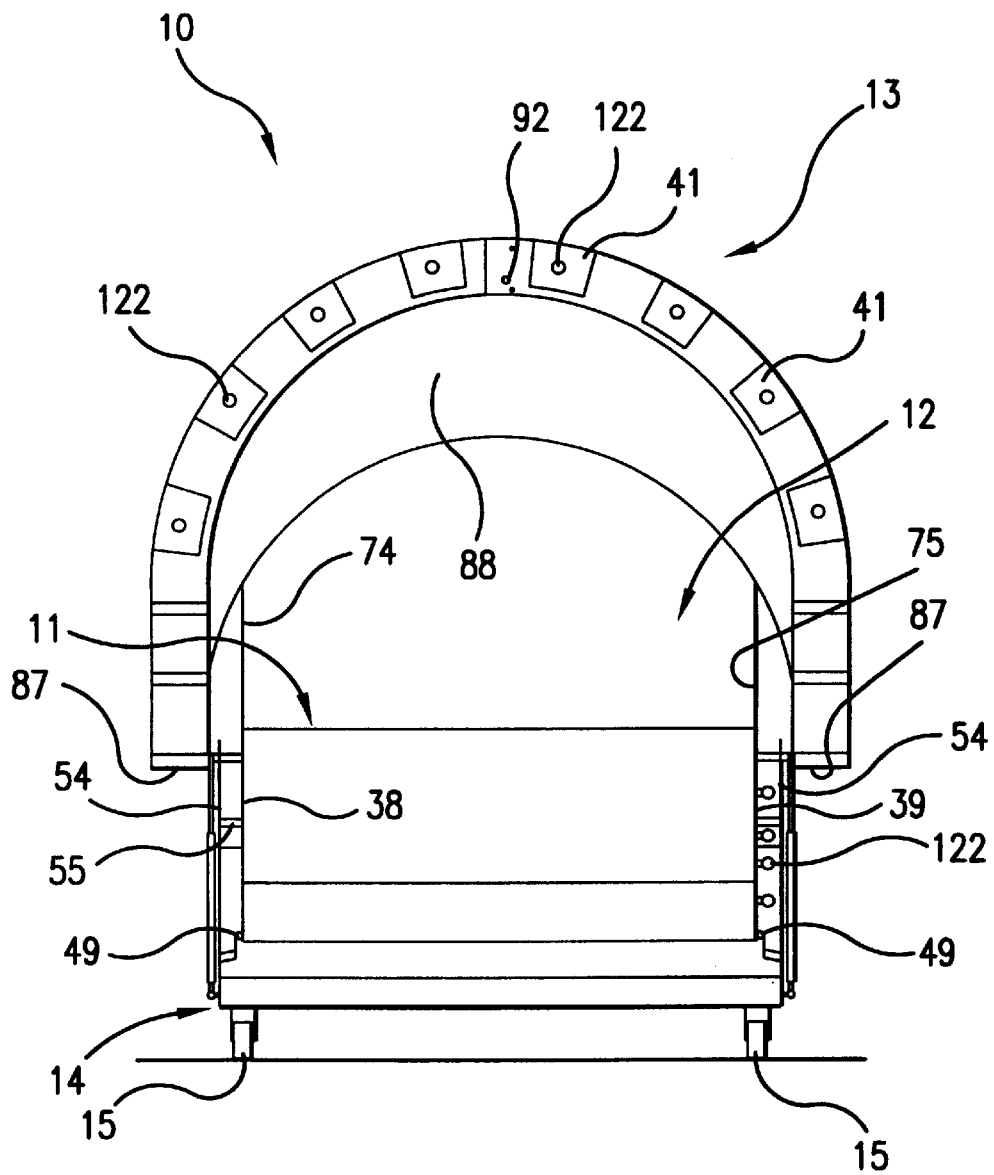
FIG. 6 is a front view of the lighting system of the present invention showing the dome cove in its "up" position, and shooting table and rear cove in the "down" position.

The dome cove 13 may be positioned in "down" position as shown if FIGS. 2–5, or in "up" position as shown in FIGS. 6 and 7 by means of the spring-biased telescopically extended members 96. The dome cove 13 is bias spring loaded to the "up" position and must be locked in the "down" position. The front of the dome cove 13 may be raised through an extended angle and secured at any intermediate position.

The inside surface 88 of the dome cove 13, as discussed above, is lined with a diffusion material 157 to ensure even light dispersion. Similar to the shooting table 11 and the rear cove 12, the diffusion material is removable for intense illumination.

Figure 27:
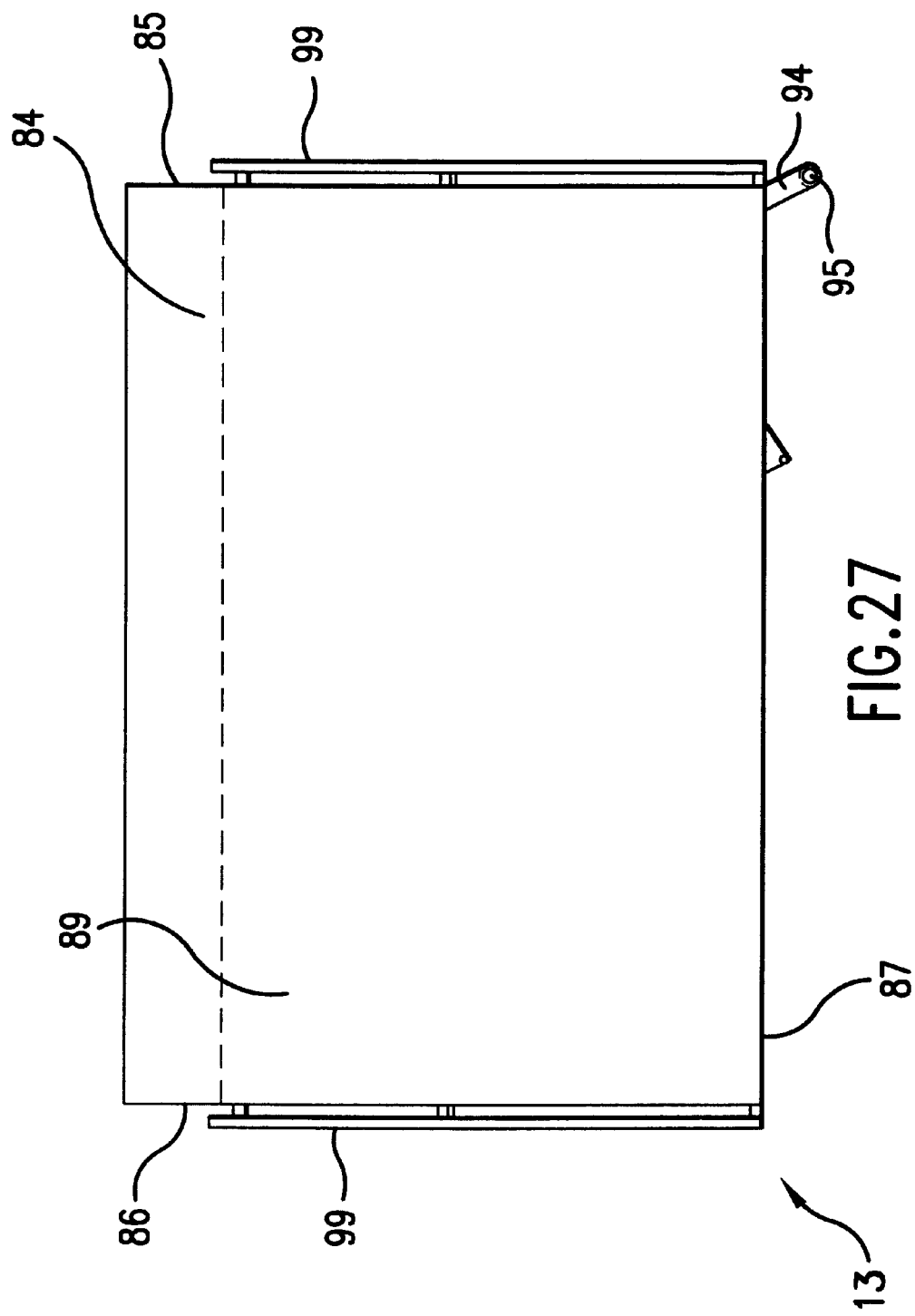
FIG. 27 is a side view of the dome cove of the present invention.

As best shown in FIG. 27, a continuous utility bar 99 extends over the front and rear portions 86 and 85 of the dome cove 13 to permit easy clamping of cords, scrims, or lighting accessories typically used in the studio environment.

The dome cove 13 wraps around the shooting table 11, so that in combination with the rear cove 12, the light sources 16 within the shooting table 11, the rear cove 12 and the dome cove 12 create a lighting envelope surrounding the object 28 to be photographed.

As shown in FIG. 26, the curved body 84 of the dome cove 13 may be shaped differently than that one shown in FIGS. 2 and 25.

As shown in FIGS. 1–8 and 28, the shooting table 11, the rear cove 12, and the dome cove 13 may be positioned "up", "down", or in any intermediate position thereof and secured as needed to accommodate a particular photographic operation.

Figure 12:
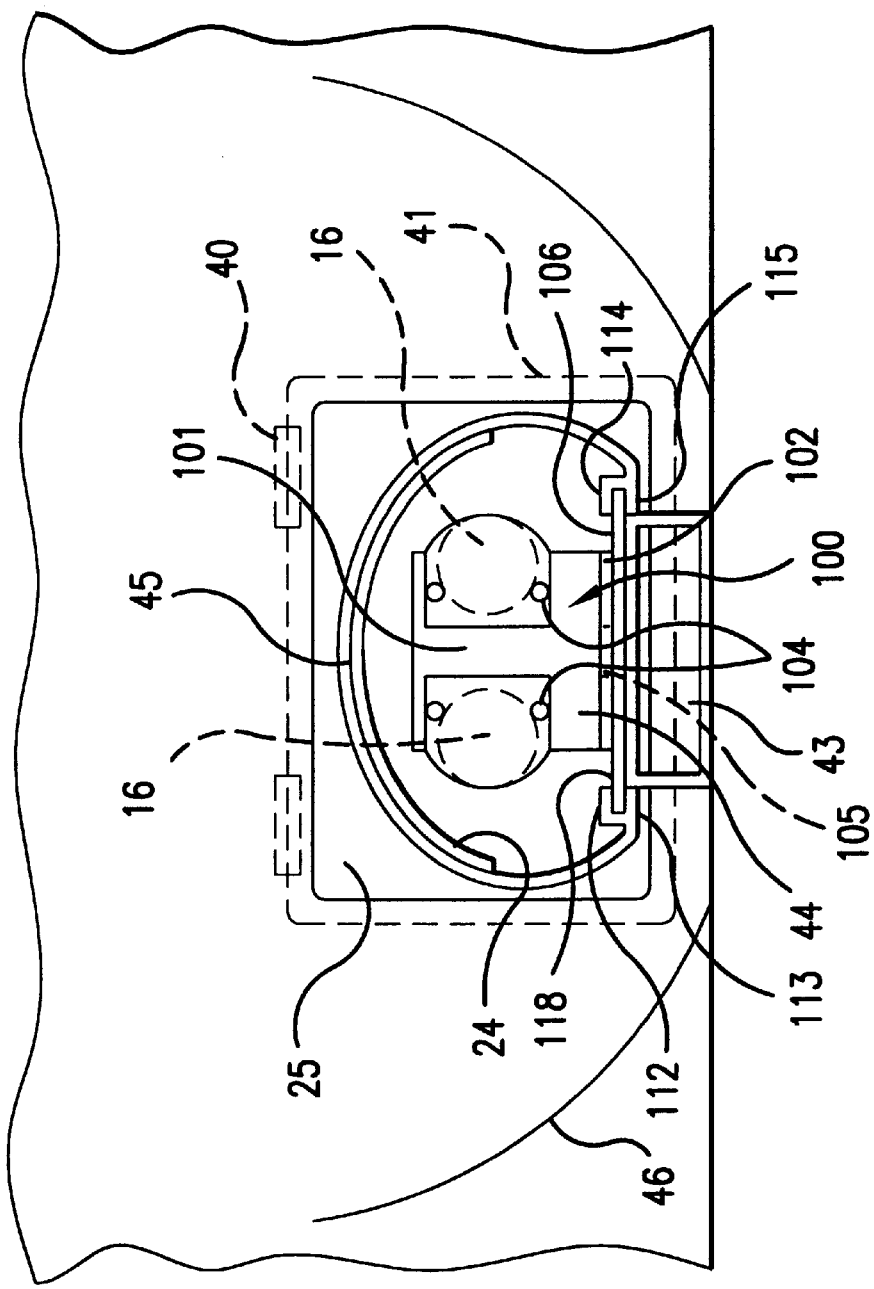
FIG. 12 is a partial cut-out of the side view of the shooting table, or dome cove, or a rear cove, showing light sources and gel holder behind the cover.
Figure 13:
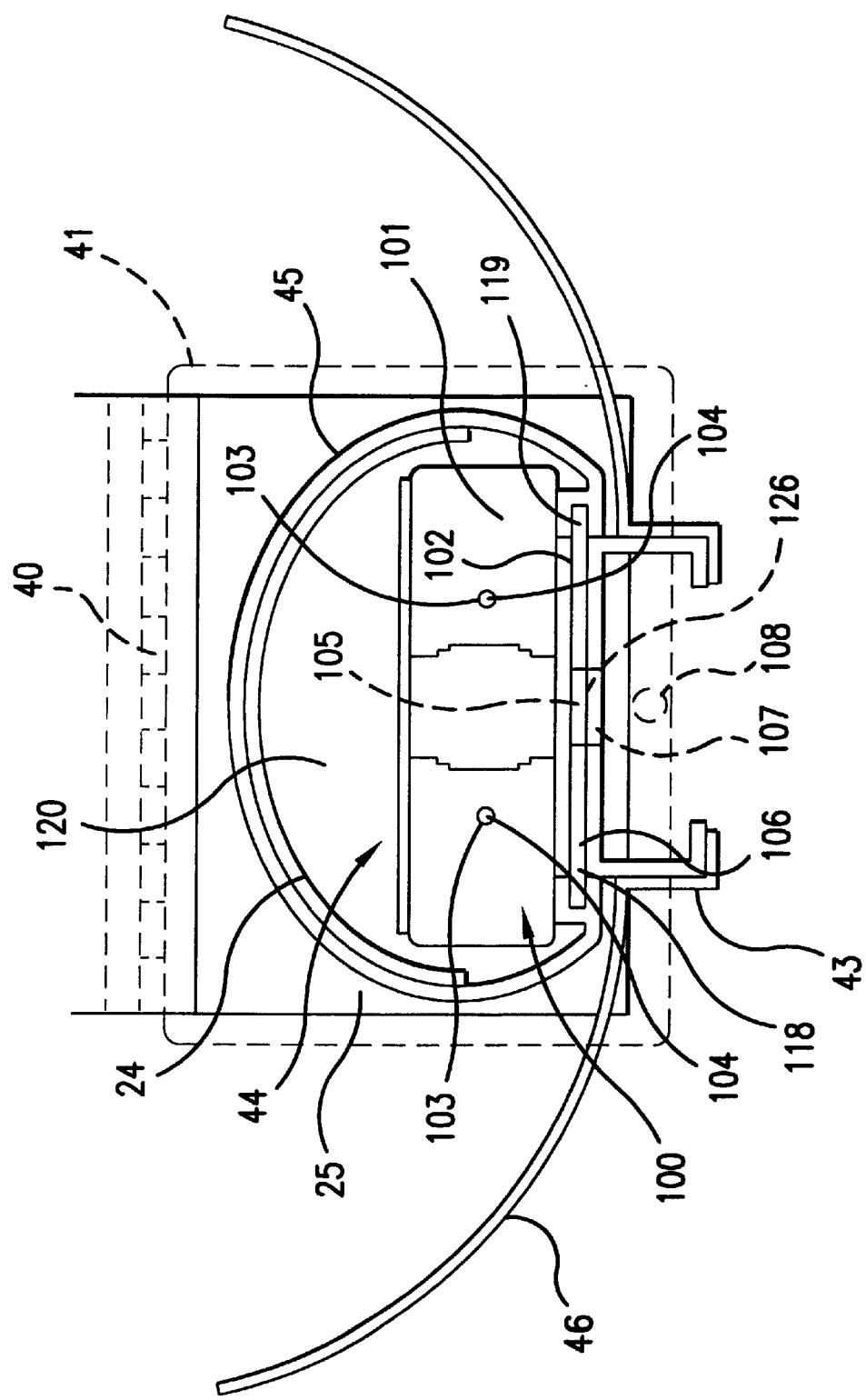
FIG. 13 is a side view of a lamp supporting unit and gel holder within a light holding module.
Figure 14:
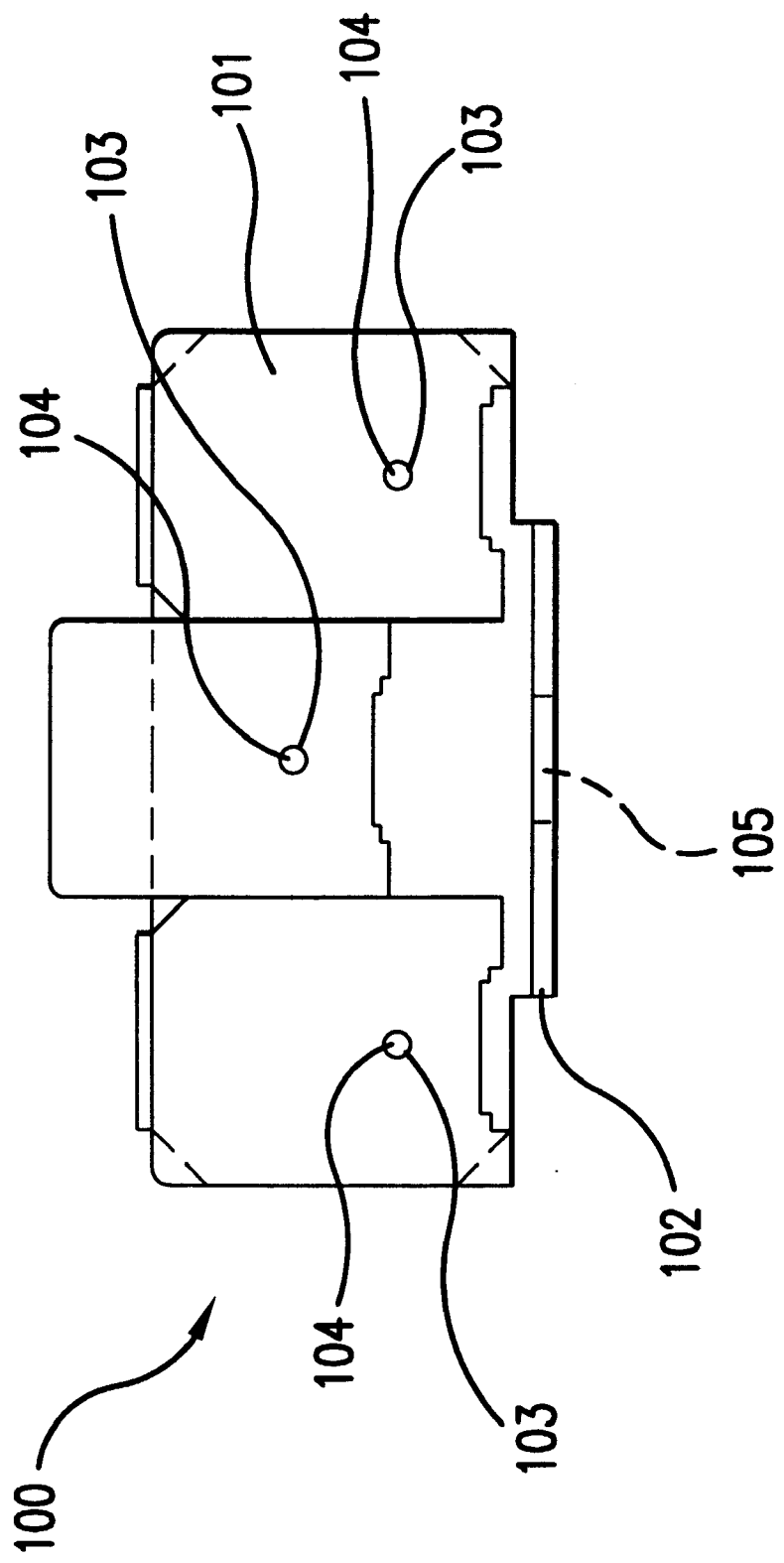
FIG. 14 is a side view of a 3-lamp supporting unit.

As shown in FIGS. 12 and 13, the light sources 16 which are dimmable light sources, particularly, luminescent lamps, are secured to the lamp supporting units 44. Each lamp supporting unit 44 has front and rear brackets 100 having a vertical wall 101 and a bent portion 102 extending in perpendicular to the wall 101. Each bracket has openings 103 in the vertical wall 101, the number of which corresponds to a number of lamps held by the lamp supporting unit 44, through which fasteners 104 protrude and secure the lamps to the vertical walls 101 of the brackets 100, on the rear and the front ends of the lamps. Each lamp supporting unit 44 may carry 1, 2, or 3 lamps as shown in FIGS. 12–14, 25, 26, and 28–29. Each bracket 100 has a hole 105 within the bent portion 102 thereof for wiring the light sources 16.

A holding plate 106 as shown in FIGS. 12 and 13, is secured to the top of each beam 43, 76, or 93, extending within the shooting table 11, the rear cove 12 and the dome cove 13, respectively. The holding plate 106 has an opening 107 aligned to the hole 105 in the bent portion 102 of the bracket 100, and also is aligned to an opening 108 provided in the beams 43, 76, and 93, at rear and front ends thereof for wiring the fluorescent lamps 16. The beams 43, 76, and 93, extending within the shooting table 11, rear cove 12 and the dome cove 13, respectively, may be box-like in cross-section thereof, as shown in FIG. 12, or have discontinued perimeter as shown in FIG. 13.

The gel holders 45, best shown in FIGS. 10–13, include a substantially semi-cylindrical body 109 having spaced apart parallel edge 110, 111, each carrying a pair of spaced apart sliding members, so that the edge 110 crries sliding members 112, 113, and the edge 111 carries sliding members 114, 115. The sliding members 112–115 extend along the respective edges 110, 111 substantially the whole length of the semi-cylindrical body 109. The sliding members 112, 113 form a slot 116 therebetween, while the sliding members 114, 115 form a slot 117 therebetween. In order to secure the gel holder 45 in proximity to the lamp supporting unit 44, the gel holder 45 is slid into the openings 25, 26, or 27 from and side of the light holding modules, i.e., the shooting table 11, the rear cove 12, and the dome cove 13, so that the sliding members 112, 113 slide along one edge 118 of the holding plate 106 (with the edge 118 sliding within the slot 116), and the sliding members 114, 115 slide along the edge 119 of the holding plate 106 (with the edge 119 within the slot 117). When installed to the place, the gel holder 45 covers the light source 16 completely along the length thereof. Being installed as shown in FIGS. 12 and 13, the gel holder 45 creates a receptable 120 extending between the inner surface 121 of the semi-cylindrical body 109 and the lamps 16 held in the lamp supporting unit 44. When desired, the gel filters, or gels 24 of any type (colored or opaque), are inserted into the receptacles 120 to cover a portion of the inner surface 121 of the gel holder 45 along the length of the light source, as shown in FIGS. 12 and 13. The gels 24, or other scrim materials, are known to those skilled in the art and can be purchased in any photography store in practically limitless number of types and colors. Being placed in the receptacle 120, the gel 24 "colors" or "blocks" the light irradiated from the light source 16 towards the object 28 to be photographed.

In order to position the gel 24 into the gel holder 45, or to remove the gel 24 therefrom, a lamp access cover 41 is to be opened. When the positioning or removing of the gel 24 is accomplished, the lamp access cover 41 is closed. As best shown in FIGS. 15–17, each lamp access cover 41 is provided with the hinge 40 secured to the upper or the lower end of the opening 25, 26, and/or 27. To facilitate the manipulating with the lamp access cover 41, a handle 122 is provided on the outer side 123 of the lamp access cover 41, and a knob 124 is provided on the inner side 125 of the lamp access cover 41 for being received within an opening 126, best shown in FIG. 13, provided at the side portions 38 and 39 of the shooting table 11, side walls 74, 75 of the rear cove 12, and front and rear portions 85, 86 of the dome cove 13 centrally and adjacent to a respectie end of the openings 25, 26, and 27, respectively. As shown in FIG. 16, the lamp access cover 41 used to cover the openings 25 of the shooting table 11 has a straight lower edge 127, while the lamp access cover 41 used for the rear cove 12 and the dome cove 13 have a curved edge 128, as shown in FIG. 16. The lamp access covers 41 are made of the same steel as other parts of the studio lighting system of the present invention.

As discussed above and as shown in FIGS. 30 and 31, and also FIGS. 2, 3, 8, 23, 25, 26, 28 and 29, the shooting table 11, the rear cove 12 and the dome cove 13 carry reflection sections 46 which may have parabolic or linear profile in cross-section thereof which may be secured underneath the beams 43, 76, and 93 extending through the shooting table 11, rear cove 12, and dome cove 13, as for instance, shown in FIG. 12, or may be custom bent, as for instance, shown in FIGS. 13 and 31 to embrace the beams. All reflection sections 46 are made of glass whit metal, for instance, aluminum, and custom bent to create necessary reflection surface for the studio lighting system 10. For linearly shaped reflectors, as shown in FIGS. 26 and 28, supporting members 126 are provided.

Figure 9:
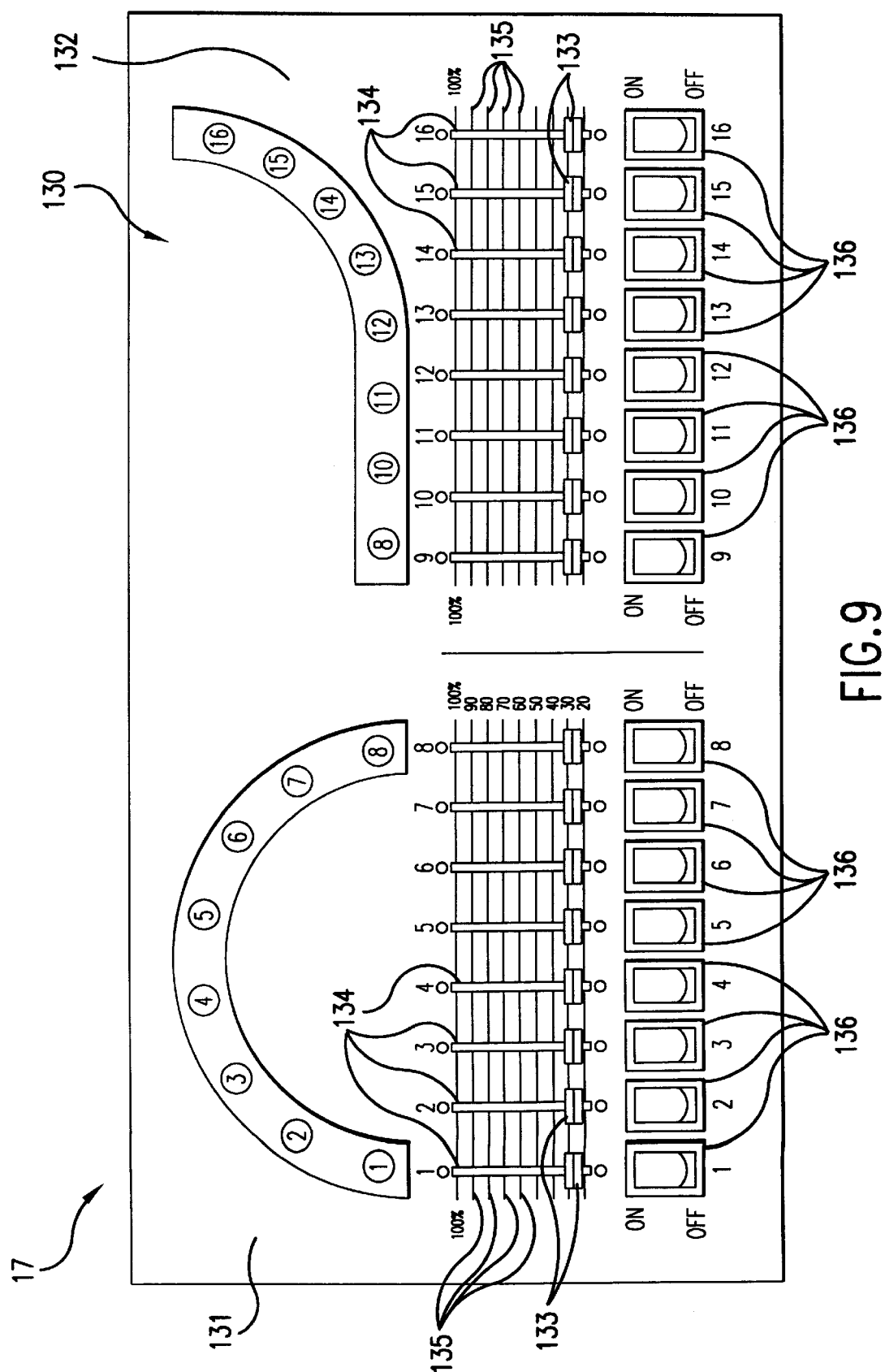
FIG. 9 shows a layout of the actuators and ON/OFF switches on the control panel of the present invention.
Figure 10:
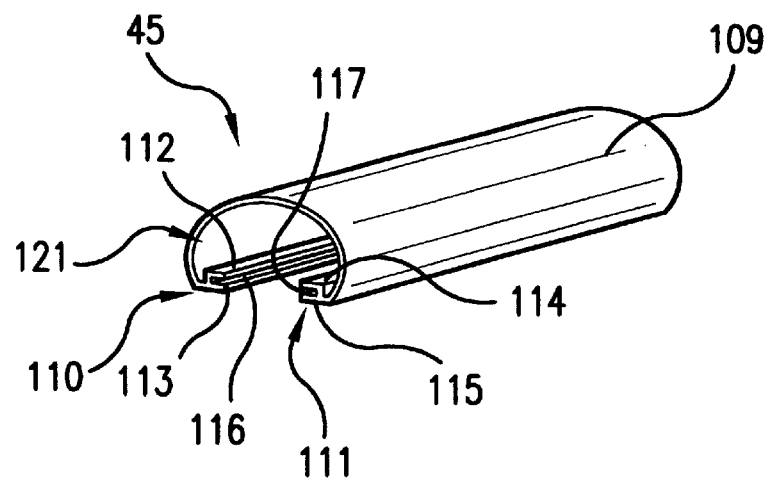
FIG. 10 is a perspective view of the gel holder of the present invention.
Figure 11:
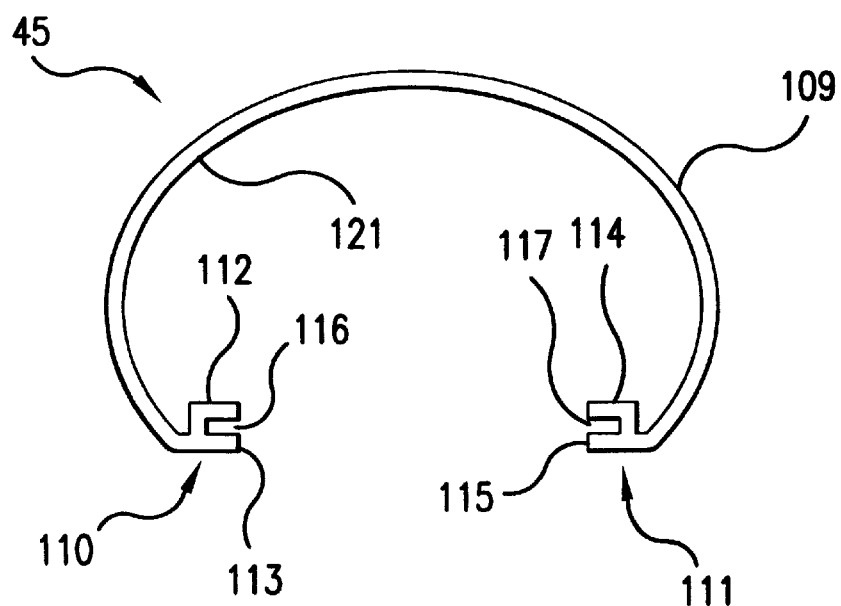
FIG. 11 is a side view of the gel holder of the present invention.
Figure 32:
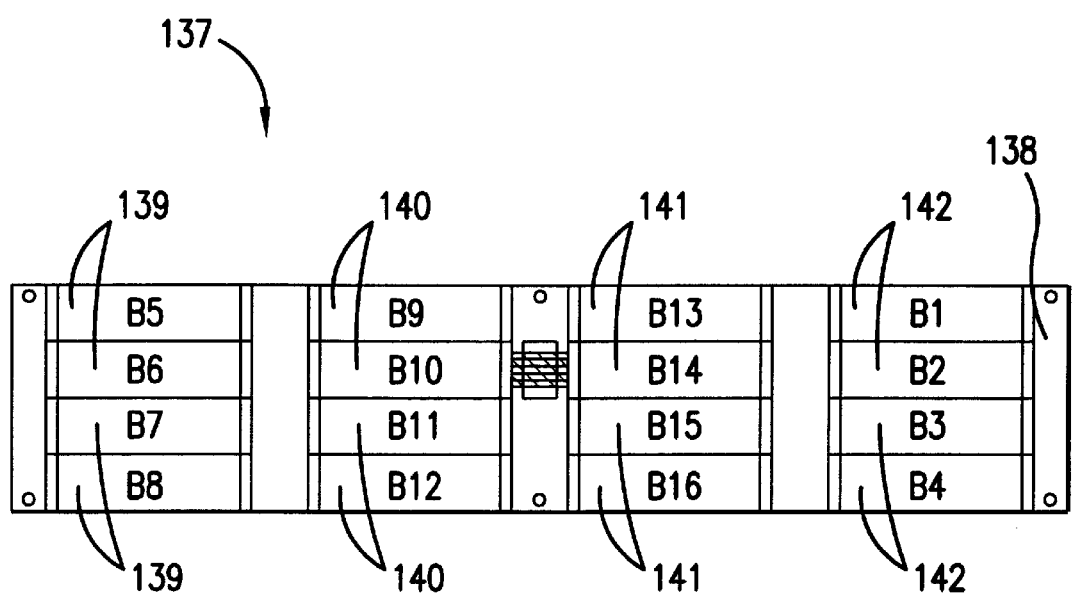
FIG. 32 is an interior layout of the ballast box of the control panel of the present invention.

The control panel 17 shown in FIG. 9 and discussed in previous paragraphs, mounts on the front end 18 of the shooting table 11 on the bar 19, as shown in FIGS. 1, 3, and 8, to allow instant adjustment of the dimmable levels of the light sources 16. As mentioned above, the control panel 17 can be positioned anywhere along the bar 19 or used remotely. The control panel 17 includes a top panel 130, shown in FIG. 9, divided into two parts—the left part 131 which serves as a reference for controlling the dome cove 13 and the right part 132 used to reference the shooting table 11 and the rear cove 12. The profile of the dome cove 13 and the shooting table 11 and the rear cove 12 are shown on the upper part of the top panel 130. Each of these profiles which are outlined on the top panel 130 of the control panel 17 includes reference points 1–16, each corresponding to a position of light sources within the dome cove 13, shooting table 11, and the rear cove 12. As shown in FIG. 9, the reference points from 1–8 correspond to the light sources 16 accommodated within the dome cove 13; the reference points form 9–12 correspond to the light sources 16 carried by the shooting table 11; and the reference points 13–16 correspond to the light sources 16 held within the rear cove 12. Below the outline of the profile of the shooting table 11, rear cove 12, and the dome cover 13, the top panel 130 has a plurality of actuators 133, each corresponding to a respective one of the reference points 1–16, and also vertical slots 134, each for one actuator 133 to slide therealong in order to gradually increase or decrease the level of intensity of each particular light source 16. As shown in FIG. 9, the horizontal lines 155 extending across the top panel 130 identify the level of intensity from zero to 100%. In the lower part of the top panel 130, sixteen on/off switches 136 are positioned for turning ON or turning OFF light sources when needed. By switching ON and OFF the switches 136 and by vertically moving the actuators 133, a photographer can control multiple zones of lighting through multiple dimming circuits so as to achieve desired lighting scenes. The control panel 17 is connected to a ballast box 137 disposed within the power cabinet 62 on the base 14. The ballast box 137 has a back panel 138 shown in FIG. 32 which includes ballasts 139 for right part 90 of the dome cove 13, ballasts 140 for the shooting table 11, ballasts 141 for the rear cove 12, and ballasts 142 for the left part 91 of the dome cove 13.

Figure 33:
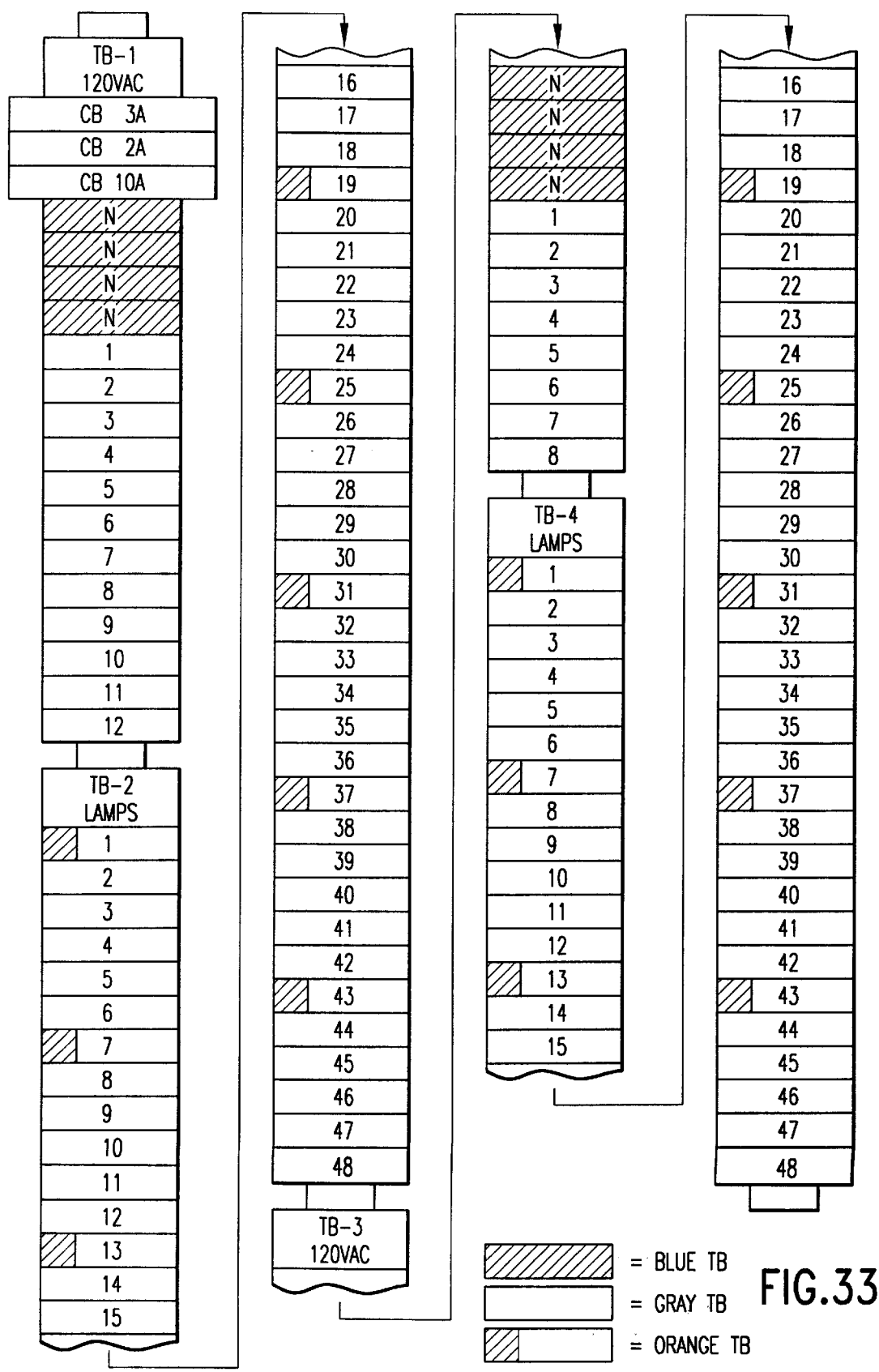
FIG. 33 shows schematically the terminal blocks laid out in the ballast box.
Figure 34A:
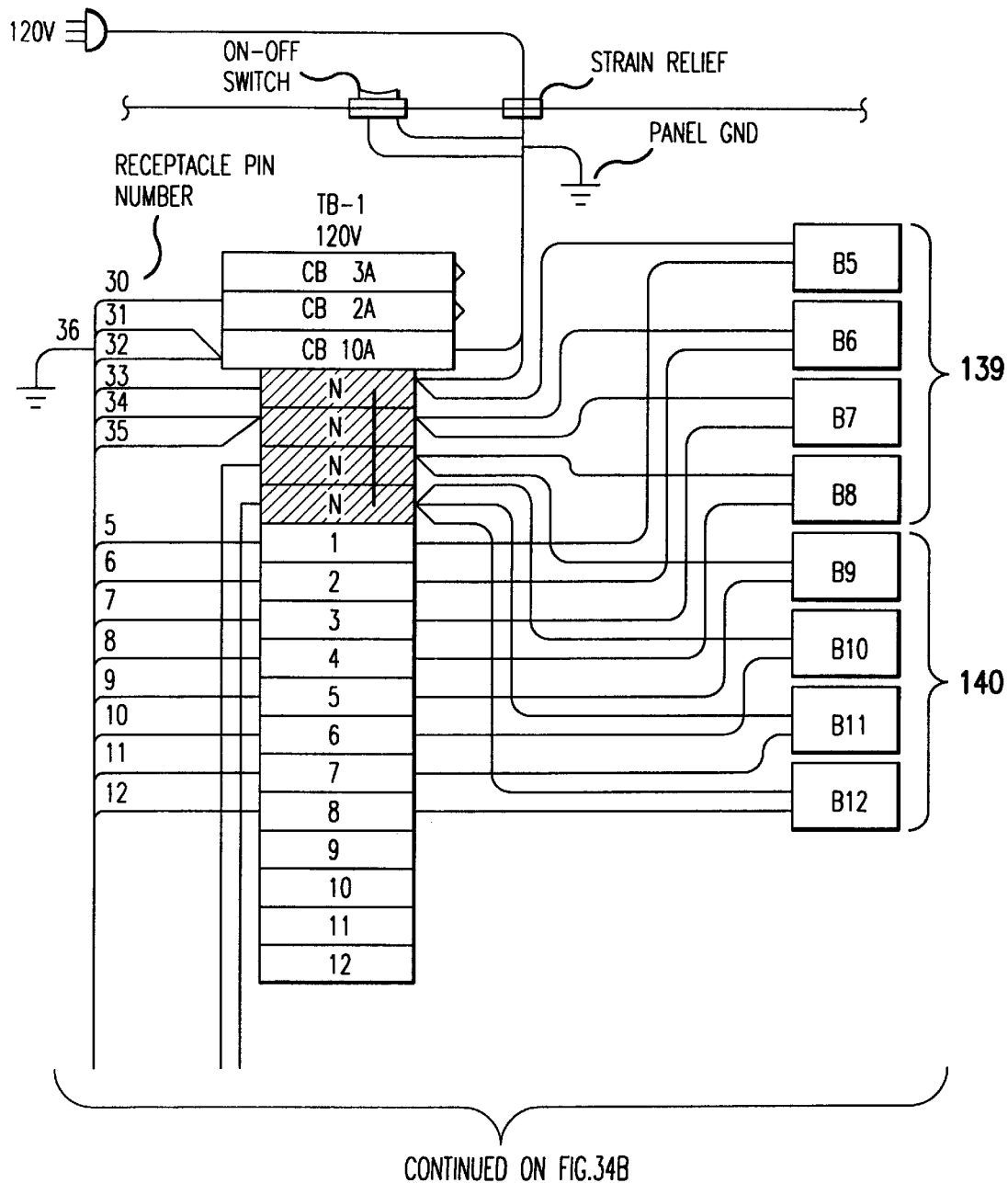
FIG. 34 is a diagram of terminal blocks ON/OFF wiring in the ballast box.
Figure 34B:
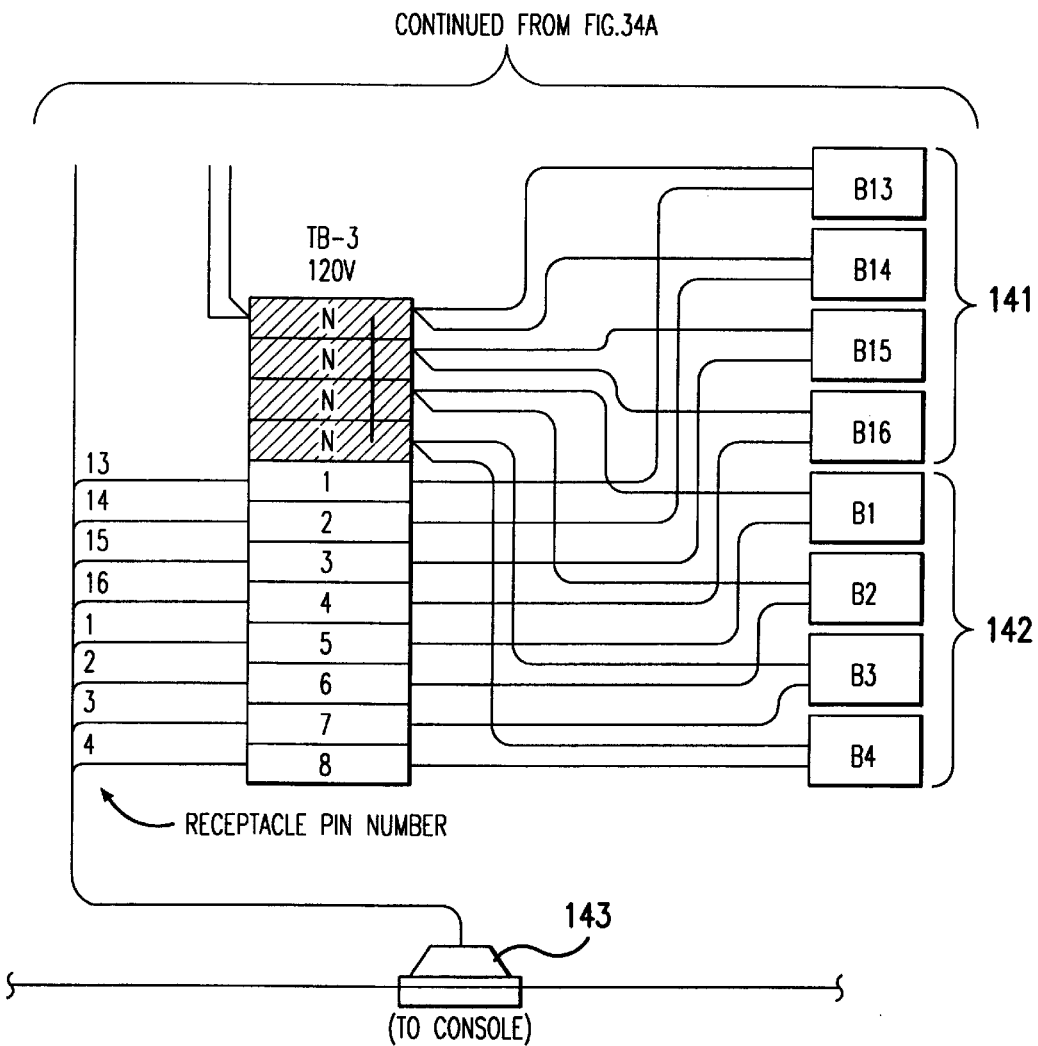
Figure 35A:
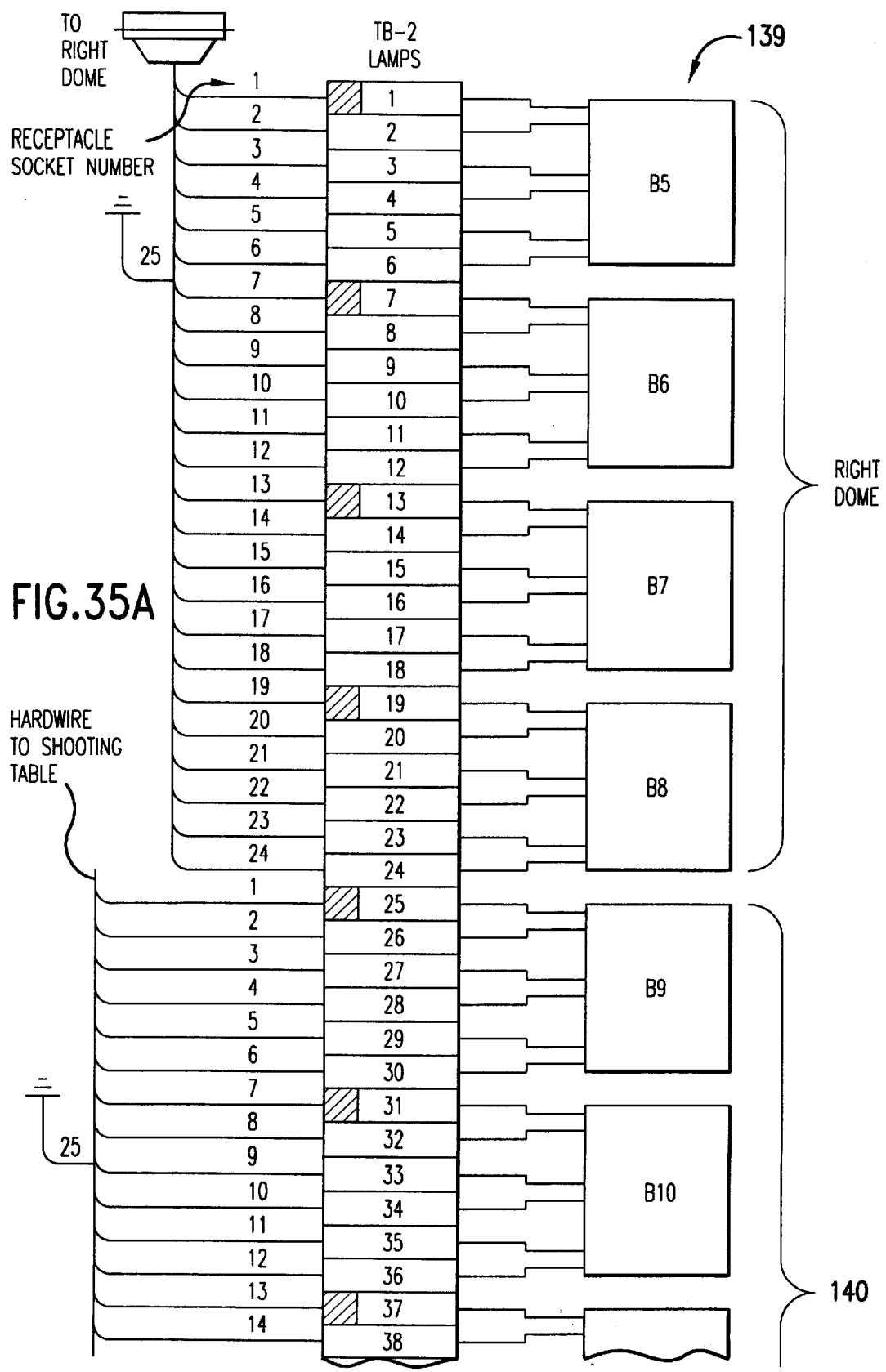
FIG. 35 is a diagram of terminal blocks lamp wiring in the ballast box.
Figure 35B:
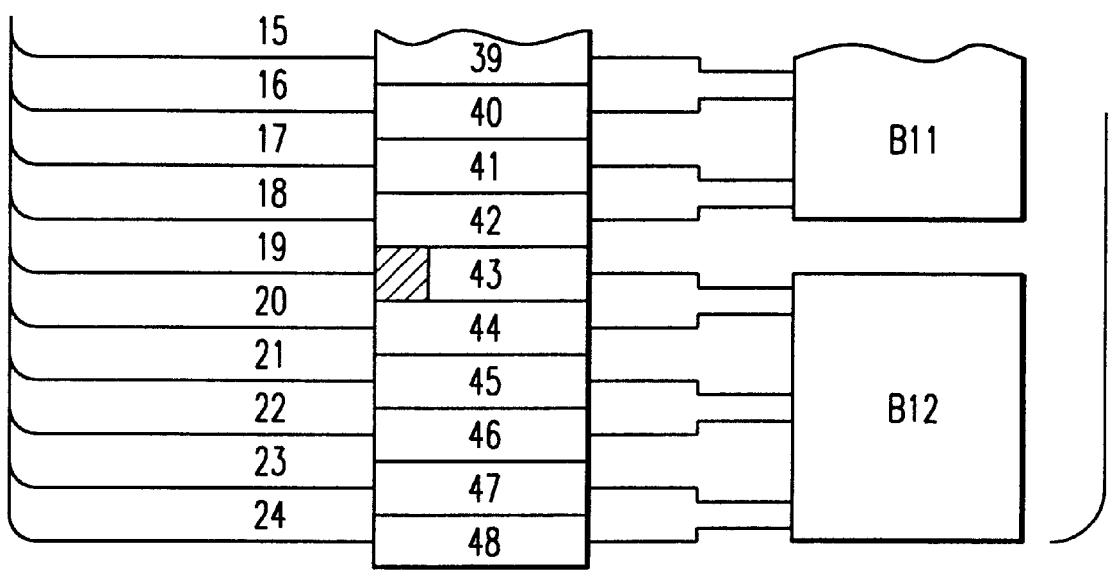
Figure 35C:
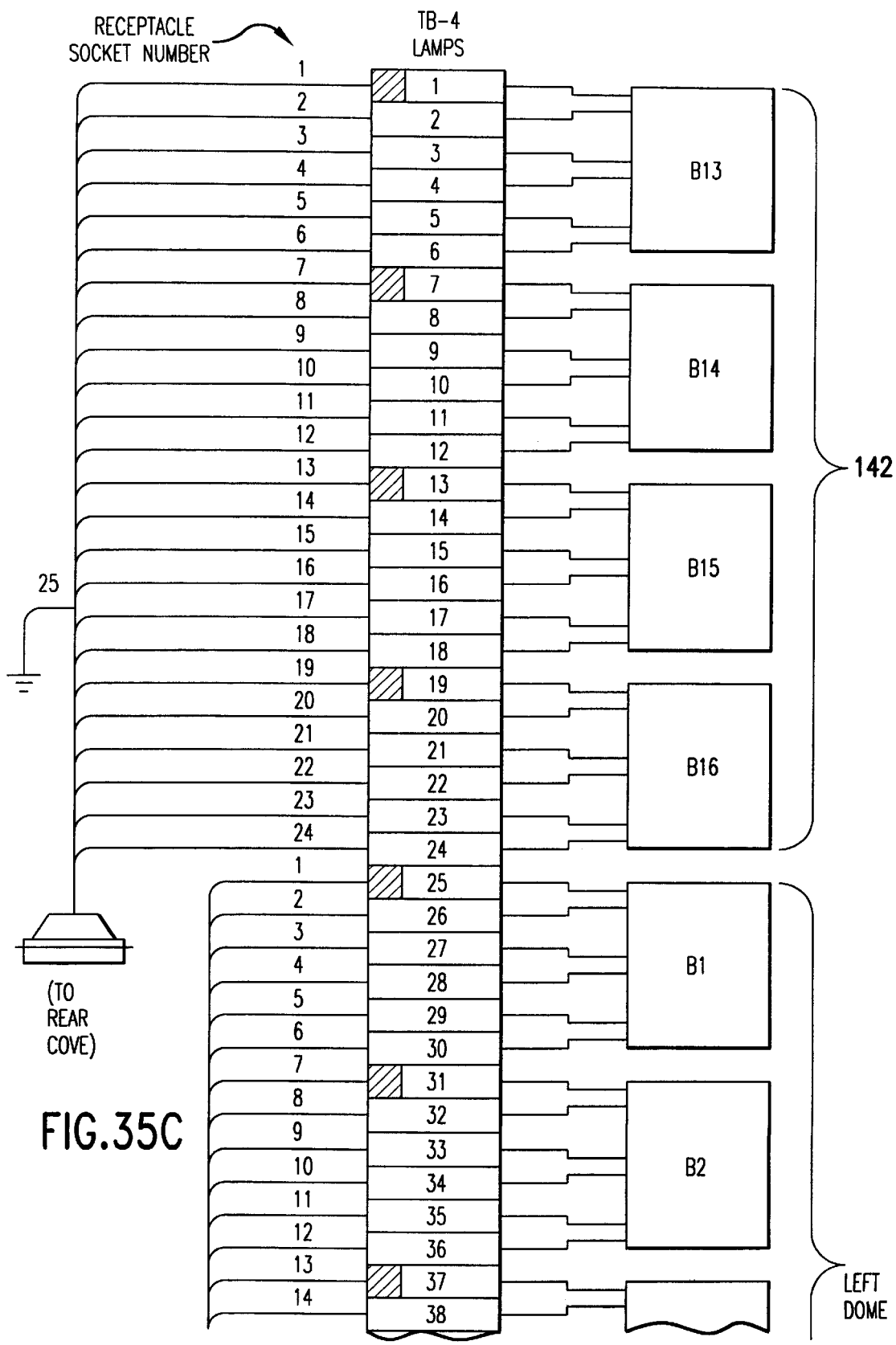
Figure 35D:
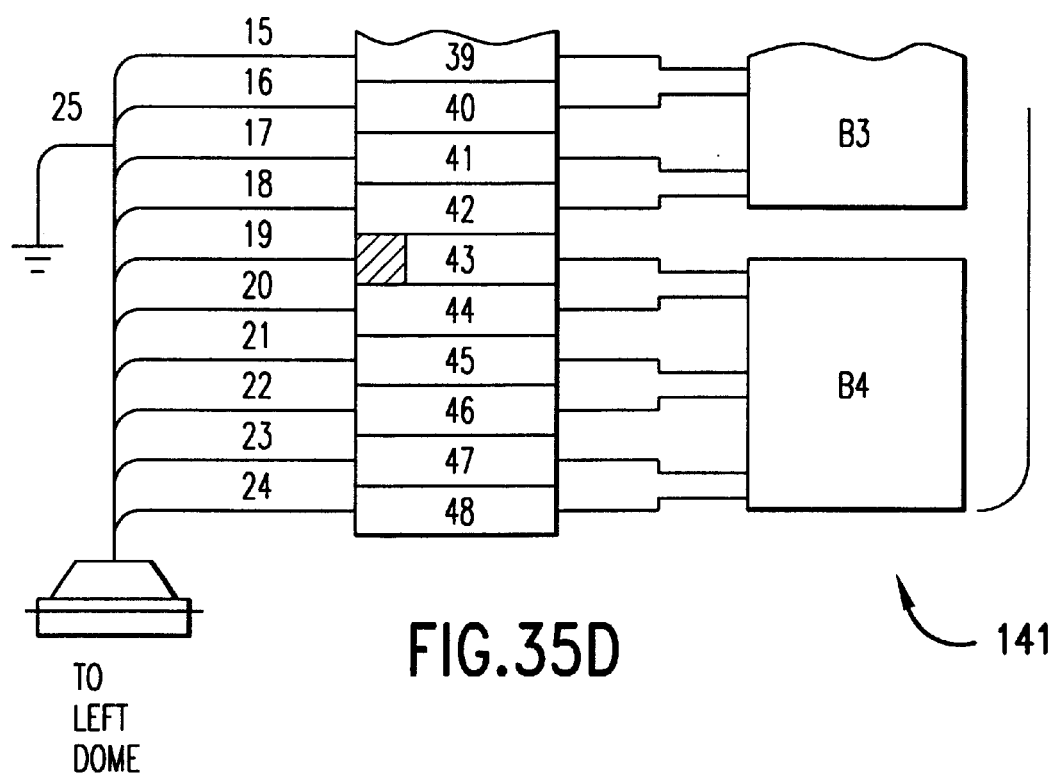

The layout of terminal blocks in the ballast box 137 is shown in FIG. 33. Referring to FIGS. 9, 33, and 34, ON/OFF wiring in the ballast box 137 corresponding to the ON/OFF switches 136 on the top panel 130 of the control panel 17, includes wiring connections between terminals 1–4 of the block TB-1 to the ballasts 139 corresponding to the right part 90 of the dome cove 13, terminals 5–8 of the block TB-1 to the ballasts 140 corresponding to the shooting table 11, wiring connection of the terminals 1–4 of the block TB-3 to the ballasts 141 corresponding to the rear cove 12, and terminals 5–8 of the block TB-3 to the ballasts 142 corresponding to the rear cove 12. The receptacle 143 having 23 sockets is used for connection to the control panel 17.

Referring to FIGS. 33 and 35, the terminals 1–24 of the block TB-2 is wired to the ballasts 139 corresponding to the right part of the dome cove 13, the terminals 25–48 are wired to the ballasts 140 corresponding to the shooting table 11, the terminals 1–24 of the block TB-4 are wired to the ballasts 142 corresponding to the rear cove 12, and the terminals 25–48 of the block TB-4 are wired to the ballasts 141 corresponding to the left part 91 of the dome cove 13.

Figure 36:
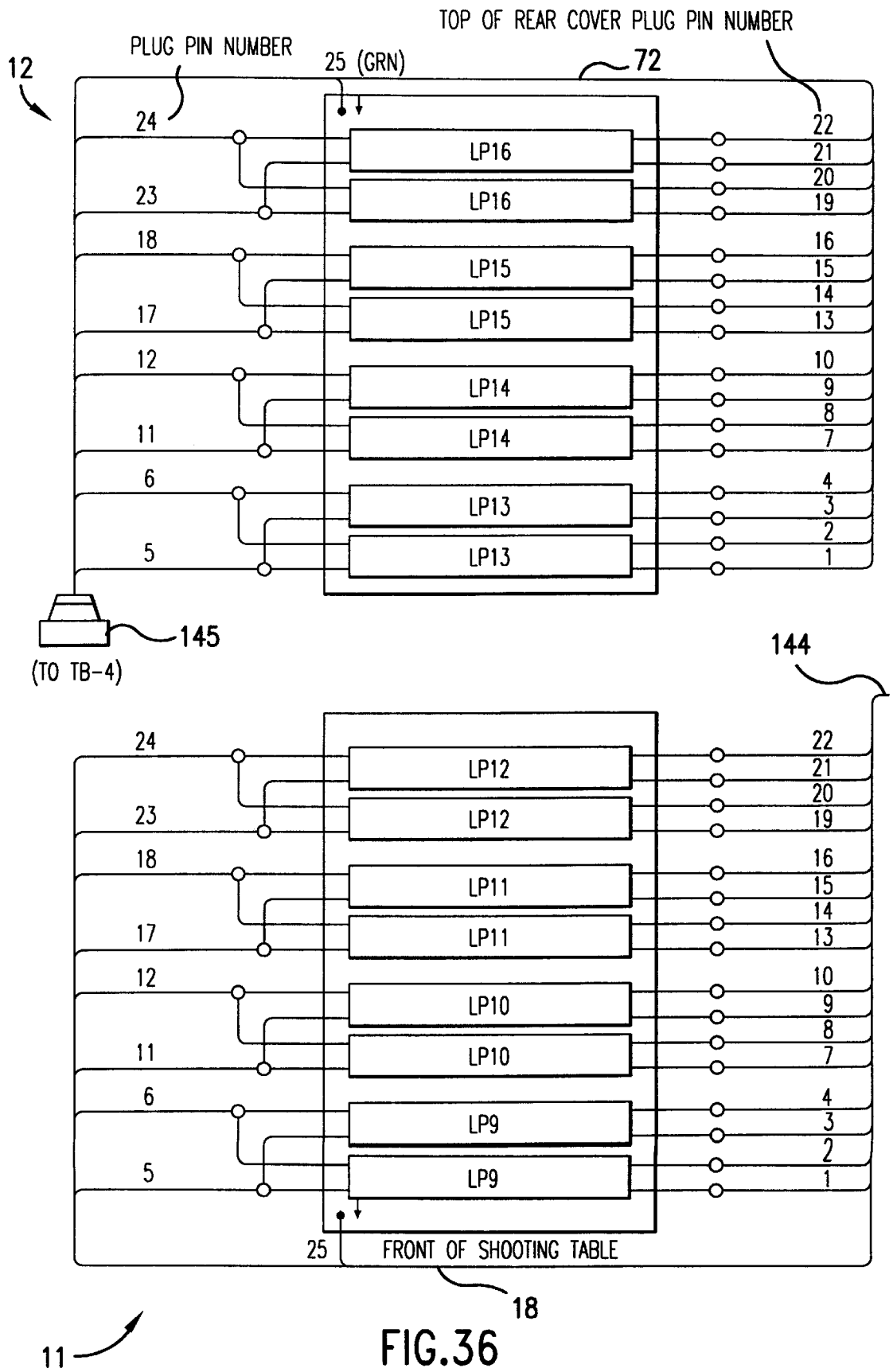
FIG. 36 is a diagram of lamp wiring in the shooting table and the rear cove.

FIG. 36 is a wiring diagram showing the lamp wiring within the shooting table 11 and the lamp wiring within the rear cove 12. The cable 144 from the shooting table 11 extends for being coupled to TB-2 terminal blocks shown in FIGS. 33 and 35; while the block 145 is to be coupled to TB-4 terminal blocks shown in FIGS. 33 and 35.

Figure 37A:
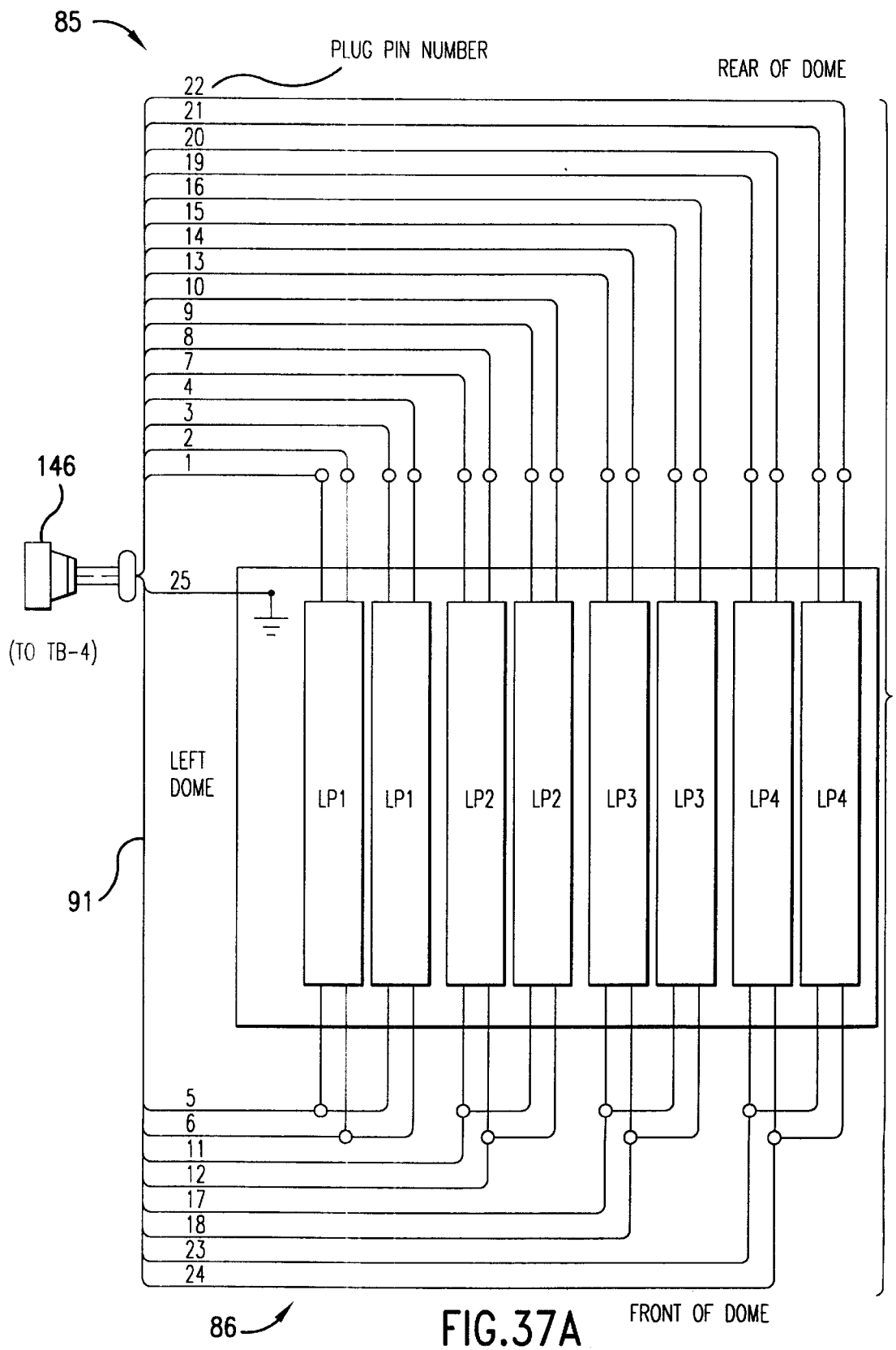
FIG. 37 is a diagram of lamp wiring of the right side of the dome cove and the left side of the dome cove.
Figure 37B:
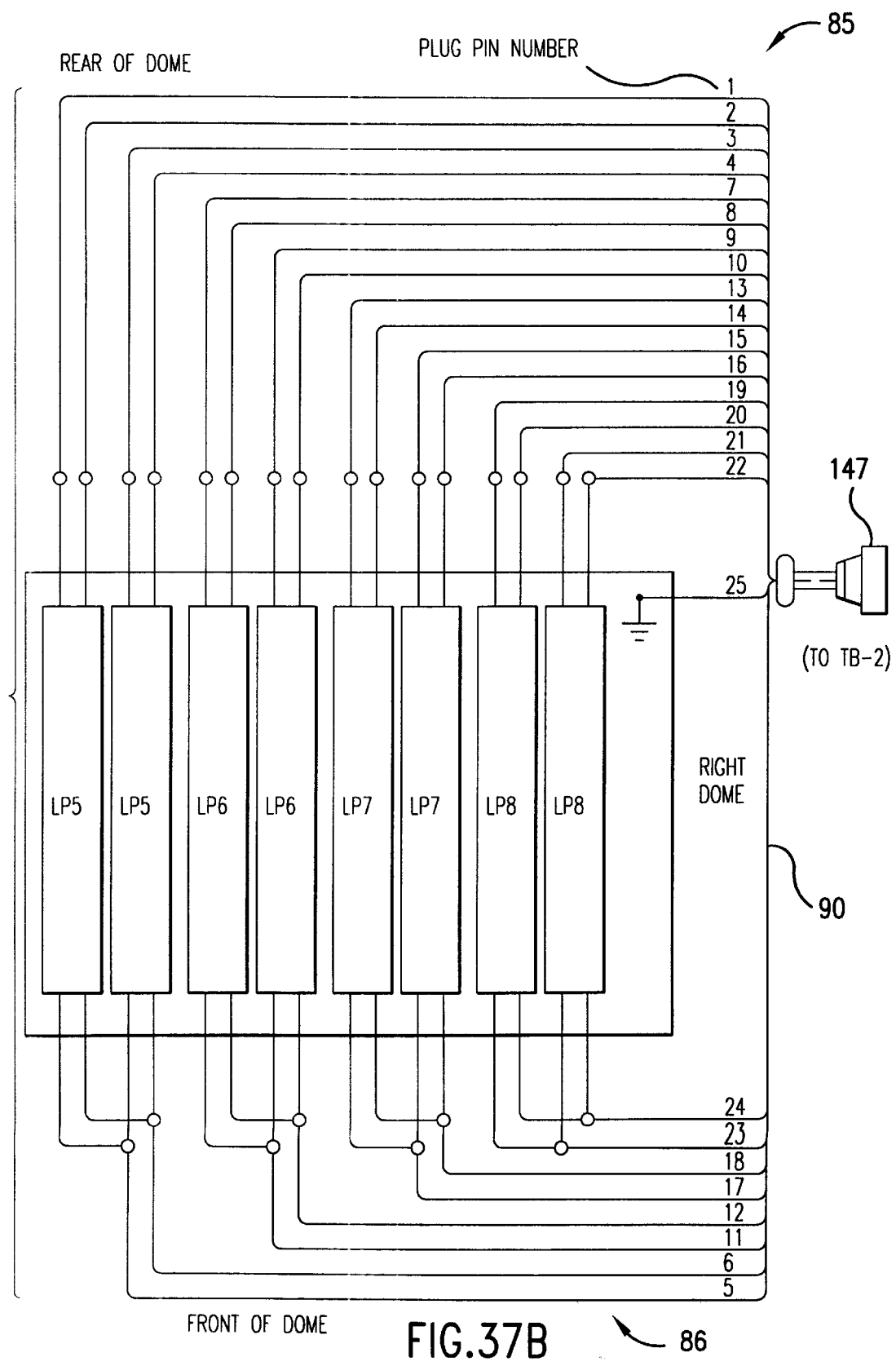

FIG. 37 is a wiring diagram for lamp wiring within the right 90 and left 91 parts of the dome cove 13. A plug 146 is to be coupled to the TB-4 terminal blocks shown in FIGS. 33 and 39, while the plug 147 is to be connected to TB-2 terminal blocks shown in FIGS. 33 and 35.

Figure 39A:
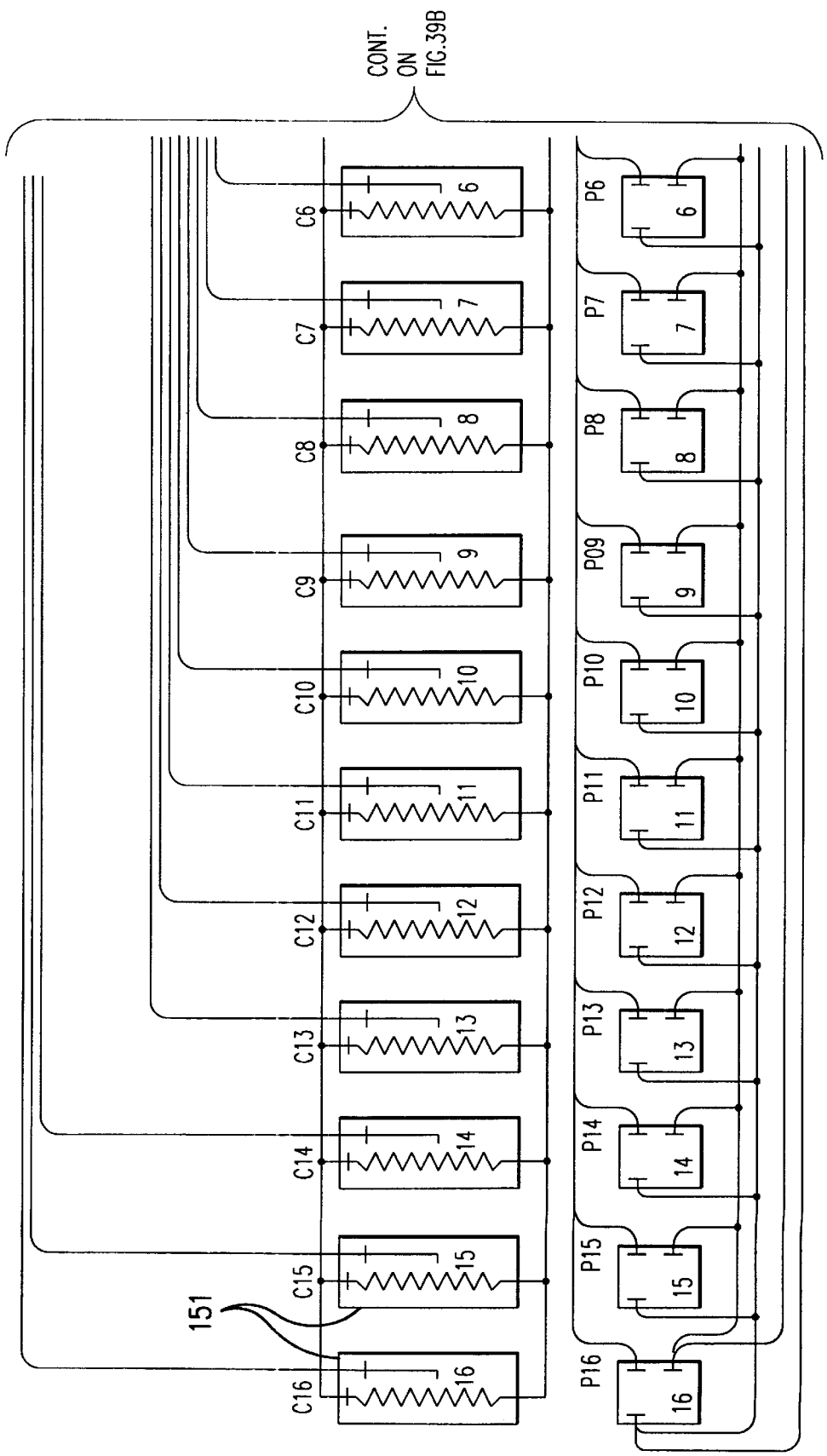
FIG. 39 is a rear view of a control console wiring of the control panel.
Figure 39B:
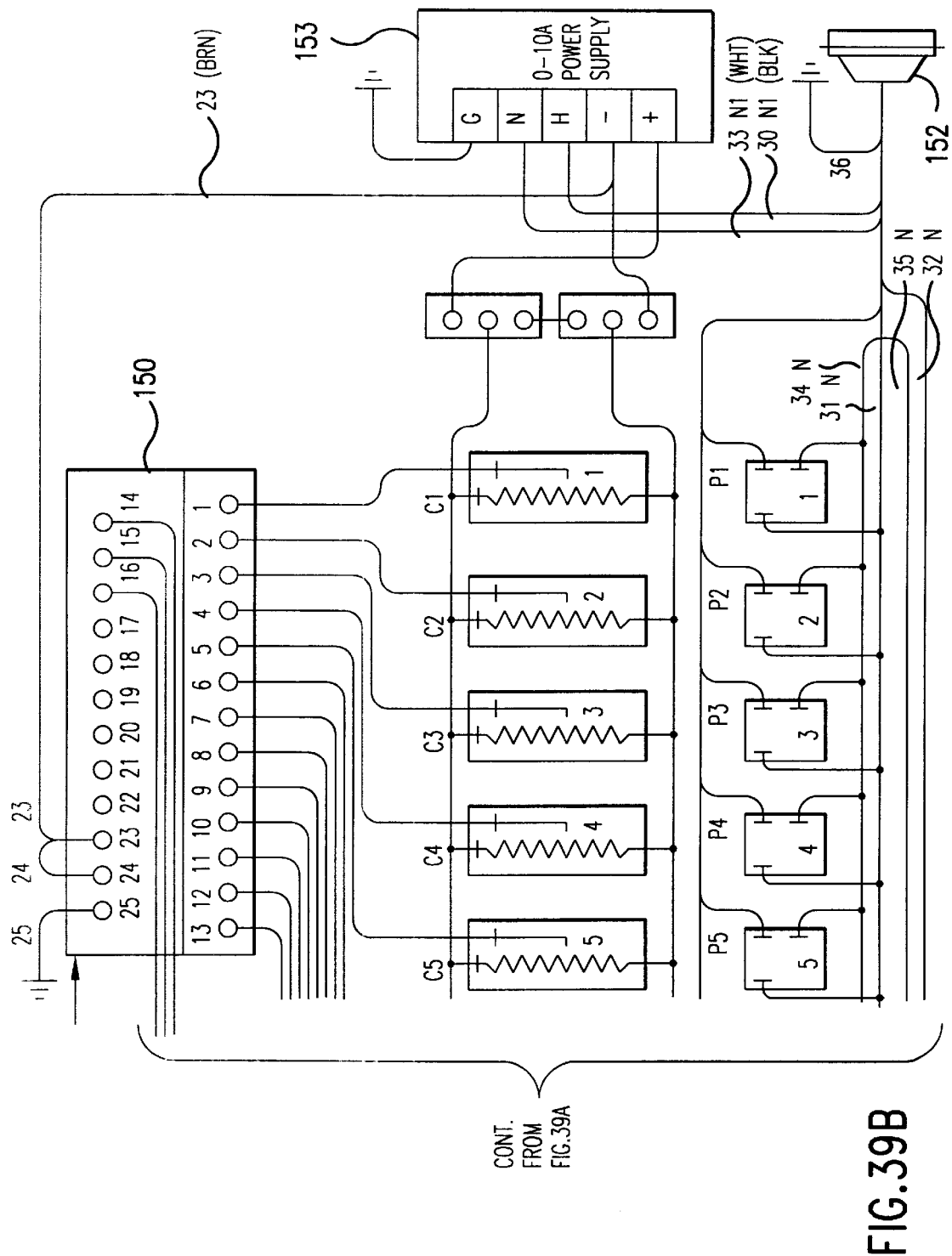

FIG. 38 is a wiring diagram of the dimmer wiring in the ballast box 137. Ballasts B1–B4 correspond to lamps in the left part 91 of the dome cove 13, the ballasts B5–B8 correspond to the lamps in right part 90 of the dome cove 13, ballasts B9–B12 correspond to the lamps in the shooting table 11, and ballasts B13–B16 correspond to the lamps in the rear cove 12. Each ballast is wired to a reference terminal block 148 and to a respective pin in the bulkhead connection 149. The similar bulkhead connection 150 is disposed on the rear side of the top panel 130 of the control panel 17 as shown in FIG. 39. Each actuator 133 slides along a resistor 151 thereby changing the load of each lamp source 16, and thereby changing an intensity level thereof. A receptacle 152 is coupled to the ballast box 137. A power supply 153 provides power to the resistors 151 and also to the ON/OFF switches 136, as shown.

When a lighting scene is to be created, a photographer places the object 28 to be photographed on the top of the shooting table 11, positions as needed the shooting table 11, the rear cove 12, and the dome cove 13, turns ON the lamps which will contribute to the lighting scene in accordance with the reference points on the top panel 130 of the control panel 17, and adjusts the intensity levels of those lit lamps by sliding the respective actuators 133 to the desired intensity level. If desired, the photographer inserts a needed type of the gel 24 into the openings 25 on the shooting table 11, 26 on the rear cove 12, or 27 on the dome cove 13. When the desired lighting scene is obtained, the photographer records the position and the type of the gels 24 used, by means of the keyboard 30, into the memory of the computer 20 and also the reference number and intensity level of the lamps contributing into the lighting scene created.

It is contemplated in the scope of this invention that the control panel includes a microprocessor 154 shown in FIG. 8 which would memorize the reference number and intensity level of the light sources 16 involved in the created lighting scene and which also could automatically transfer the data to the computer 29 for being recorded therein.

In further process of photography, when the created desired lighting scene is needed to be reproduced, a photographer or an operator who is not as experienced as the photographer who created the desired lighting pattern, can retrieve the data adequate to the desired lighting pattern (including the reference point and the intensity level of the light sources contributing into the lighting scene, as well as type and position of the gels 24 used in the process) from the memory of the computer 29 and can, in accordance with this retrieved data, insert the same type of gels in the same positions as was done when the desired lighting scene was created, as well as by manipulating the actuators 133, achieve the same intensity levels of the same light sources 16 which were used for the desired lighting pattern, thereby reproducing the lighting pattern.

As described above, the studio lighting system 10 of the present invention uses three independent light holding modules, i.e., the shooting table 11, the rear cove 12 and the dome cove 13 as one integrated system. The possibility to control light from any angle offers spectacular creative options and unparalleled image composition. A photographer using the lighting system 10 of the present invention has practically unlimited number of possible combinations of angular, directional and reflective lighting at the touch of his/her fingers. The shooting table 11 offers several background and bottom lighting options, frontal fill variations, side highlights and reflective control with depth and contrast command. The rear cove 12 is perfectly suitable for general backlighting and rear directional illumination, as well as for creative backgrounds. The dome cove 13 is best used for directional highlights and creative fill. The specialized arch shape improves difficult texture and contrast situations because the light is uniform and allows infinite adjustments to create outstanding fill and wrap-around highlights. Each to access gel holders retain colored gels or various scrim material which can be used in endless combination thereof.

The studio lighting system 10 of the present invention constitutes a bright fluorescent lighting system for digital imaging with approximately 62 sq. ft. of diffused, non-reflected light available for directional and illumination adjustment. A production of 90,000 lumens is found using approximately 1,024 watts of power.

System 10 operates on a single 120 VAC, 15 AMP circuit with no special or external power packs required. Consistent fluorescent lamp output and performance light rated at 30,000 hours. The system 10 in operation has been designed with 16 double or triple lamp fixtures, each dimmable from 5% to 100% of the level of intensity.

Rapid start solid state electronic ballasts operate about 20 KHz to eliminate interference with sophisticated electronic imaging equipment. The power cabinet 62 protects all wiring connections and ballasts.

The lighting system of the present invention is designed for professional and commercial use with digital still imaging equipment. Other applications contemplated in the scope of the present invention include digital video, analog video, or film.

Durable and flexible diffusion material 157 which covers the top surface of the shooting table 11, the inner surface of the concave body of the rear cove 12, and the internal surface of the dome cove 13, may be removed for obtaining higher light output. As discussed above, continuous utility bars surround the front and rear of the dome cove 13 and the top end of the rear cove 12 to simplify clamping of scrims, cards, and auxiliary accessories.

The lighting system of the present invention is a "smart" lighting system where a photographer can control dimming, shutters, contrasts, tones, colors, reflections, bright or dark areas, all with just hand through the control panel 17 provided for this lighting system. It is also possible to obtain absolute control from any side angle or intensity of the side lighting, back lighting, top lighting, or rear lighting.

Since the studio lighting system 10 is completely integrated, color temperature remains over the broad spectrum at a constant 5,000K. This results in brilliant lumen output, with minimal heat. Lamp light is rated at 30,000 hours and does not distort resolution levels or the spectral sensitivity of electronic imaging. The subject system 10 results in a bright fluorescent lighting system with flickerfree, full spectrum output. A small blanket of variable illumination is diffused uniformly over all lighting surfaces. The diffusion design is superior to fabric or grid material, resulting in a spectacular array of circular-like, selective, split or proportional effects.

The shooting table, dome cove, and rear cove are designed as individual light sources, but may be used either individually or in combination in a vast number of different combinations. They are individually adjustable at various positions, providing limitless range and shooting angles from nearly any position, thereby providing a versatile lighting system.

Heavy gauge steel, fabricated and welded, is used throughout to ensure durability and reliability under intense working conditions. Components are powder coated in a traditional studio matte black abrasion-resistant finish.

The power cabinet is accessible below the rear cove. All wiring and electrical components are designed for easy maintenance within the power cabinet. Fluorescent light ballasts provide dimming, minimize heat, and ensure long life.

Gas springs serving as supporting members extended between the base and the light holding modules allow effortless repositioning of the shooting table, dome cove, and rear cove in any combination. The support frame, or the base, supports the shooting table, dome cove, rear cove and the power cabinet. Frame rests on heavy-duty locking casters for easy movement and secure positioning.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular location of elements may be reversed or interposed, all without departing from the spirit or scope of the invention as defined in the appended Claims.

What is claimed is:

1. A studio lighting system comprising:
   at least one light holding module,
   a plurality of elongated dimmable light sources removably received within said at least one light holding module and arranged therein in substantially parallel mutual disposition thereof, said plurality of light sources forming a lighting envelope around an object to be photographed or digitally captured, said lighting envelope being formed of the light irradiated from the plurality of the substantially parallel lengths of said light sources within said at least one light holding module;
   a plurality of gel holders, at least one of said gel holders being removably attached to a respective one of said light sources and forming a receptacle extending therebetween substantially along the length of said respective light source;
   at least one filter, said at least one filter being removably disposed within said receptacle substantially along the length of said respective light source to filter the light irradiated from substantially the whole length of said respective light source towards said object; and
   memory means, for recording intensity levels of said light sources, and a position and a type of said at least one filter.

2. The studio lighting system of claim 1, wherein each of said gel holders includes a substantially semi-cylindrical body having first and second spaced apart parallel edges extending in a longitudinal direction and a pair of spaced apart sliding members, extending along each of said first and second edges substantially throughout the length of said semi-cylindrical body, said sliding members forming a slot therebetween;
   said studio lighting system further including a plurality of lamp supporting units, at least one of said light sources being attached to a respective one of said lamp supporting units, each of said lamp supporting units including a holding plate having a first and second side edge;
   each of said side edges of said holding plate being received within a respective one of said slots formed between said sliding members of said gel holders, thereby removably attaching said gel holder to said at least one light source with said at least one light source extending longitudinally within said semi-cylindrical body substantially throughout the length thereof.

3. The studio lighting system of claim 1, wherein said at least one filter includes a gel.

4. The studio lighting system of claim 1, wherein said plurality of light sources and said at least one filter form a desired lighting pattern, said studio lighting system further including controlling means, said controlling means retrieving data responsive to said desired lighting pattern from said memory means and reproducing said desired lighting pattern.

5. The studio lighting system of claim 1, further including a plurality of independently positionable light holding modules, said light sources extending internally within each of said light holding modules.

6. The studio lighting system of claim 5, wherein said plurality of light holding modules include a tiltable shooting table underlying said object to be photographed or digitally captured, a rear cove pivotal with respect to said shooting table, and a pivotal dome cove wrapping around said shooting table.

7. The studio lighting system of claim 6, further including a carrying frame, said shooting table, said rear cove and said dome cove being mounted on said carrying frame, and a plurality of wheels secured to the bottom of said carrying frame.

8. The studio lighting system of claim 4, wherein said controlling means further includes a control panel and a plurality of actuators, each of said actuators being associated with a respective one of said light sources, said intensity levels of said light sources being adjustable by manipulating said actuators on said control panel.

9. A studio lighting system comprising:
   a plurality of independently positionable light holding modules;
   a plurality of elongated light sources extending internally within each of said plurality of said light holding modules in substantially parallel mutual disposition thereof, said light sources having controllable intensity levels;
   at least one filter extending along the length of a respective one of said light sources within at least one of said light holding modules to filter light irradiated from the length of said respective light source, the light irradiated from the plurality of substantially parallel lengths of said plurality of light sources and said at least one filter forming a desired lighting pattern substantially enveloping an object to be photographed or digitally captured;

memory means for recording said desired lighting pattern represented by said intensity levels of said light sources and a position and a type of said at least one filter; and controlling means for retrieving data associated with said desired lighting pattern and reproducing said desired lighting pattern.

10. The studio lighting system of claim 9, wherein said plurality of independently positionable light holding modules includes:
   a tiltable shooting table, said shooting table having a top surface, a bottom surface, a front end, a rear end, said object to be photographed or digitally captured being positioned on said top surface of said shooting table;
   a rear cove pivotally arranged at said rear end of said shooting table, said rear cove having a lower end and an upper end; and,
   a dome cove wrapping around said shooting table and pivotable with respect to said rear end of said shooting table, said dome cove having a pair of side ends and a rear portion.

11. The studio lighting system of claim 10, further including a base and supporting members extending between said base and said light holding modules and supporting said light holding modules in desired positions thereof.

12. The studio lighting system of claim 11, wherein said base includes a carrying frame, said carrying frame having a pair of spaced apart parallel side beams, each having a top, a bottom, and a rear end, a stand mounted at said rear ends of said side beams and extending upwardly from said top thereof, said stand includes a housing and a pair of supporting flanges extending upwardly at the top portion of said housing, and wheels, said wheels being mounted to said bottom of said side beams, at least one of said wheels having a locking mechanism.

13. The studio lighting system of claim 12, wherein said supporting members include:
   (a) a pair of first spring-biased telescopically extending members, each having upper and lower ends, each of said first telescopically extending members having said lower end thereof pivotally mounted to a respective one of said side beams of said carrying frame and said upper end thereof pivotally mounted to said bottom surface of said shooting table at said front end thereof;
   (b) a pair of second spring-biased telescopically extending members, each having upper and lower ends, each of said second telescopically extending members having said lower end thereof pivotally mounted to a respective one of said side beams of said carrying frame and said upper end thereof pivotally mounted to said bottom surface of said shooting table between said front and rear ends thereof;
   (c) a pair of third spring-biased telescopically extending members, each having upper and lower ends, each of said third telescopically extending members having said lower end thereof pivotally mounted to a respective one of said side beams of said carrying frame and said upper end thereof pivotally mounted to said dome cove at a respective one of said pair of side edges thereof; and,
   (d) a pair of fourth spring-biased telescopically extending members, each having upper and lower ends thereof, said fourth member having said upper end thereof pivotally mounted to said rear cove and said lower end thereof pivotally mounted to said top of said housing of said stand.

14. The studio lighting system of claim 13, wherein said rear end of said shooting table, said rear portion of said dome cove and said lower end of said rear cove are pivotally mounted to said pair of supporting flanges at said stand of said base.

15. The studio lighting system of claim 10, wherein said shooting table accepts horizontal and tilting positions, wherein said rear cove accepts lower position, upper position and intermediate position, and wherein said dome cove accepts lifted position and horizontal position.

16. The studio lighting system of claim 12, further including electrical circuitry associated with said controlling means, said electrical circuitry being disposed within said stand.

17. The studio lighting system of claim 9, further including a control panel and a plurality of actuators on said control panel, each said actuator being associated with a respective one of said light sources and controlling said intensity level thereof, said control panel being disposed at said front end of said shooting table.

18. A studio lighting system, comprising:
   a tiltable shooting table having a front end, a rear end, and a pair of side portions:
   a rear cove having an upper end, a lower end pivotally mounted at said rear end of said shooting table, and a concave body having two side walls thereof and extending between said upper and said lower ends;
   a dome cove having a curved body, said curved body having a front portion, a rear portion, and a pair of side edges extending between said front and rear portions thereof;
   said shooting table, said rear cove and said dome cove being independently movable;
   a plurality of parallel spaced-apart first light sources extending internally within said shooting table between said side portions thereof and substantially in parallel to said front and rear ends thereof;
   a plurality of parallel spaced-apart second light sources extending internally within said concave body of said rear cove between said side walls thereof and substantially in parallel to said upper and lower ends thereof;
   a plurality of parallel spaced-apart third light sources extending internally within said curved body of said dome cove between said front and rear portions thereof and substantially in parallel to said side edges thereof;
   each of said first, second and third light sources having first and second ends thereof;
   the light irradiating from the parallel lengths of said first, second and third light sources within said shooting table, said rear cove and said dome cove, respectively, forming a lighting envelope surrounding an object to be photographed or digitally captured;
   a plurality of gel holders, each mounted adjacent to respective one of first, second and third light sources and covering said respective light source along the length thereof;
   a plurality of gels, each being removably disposed within a respective one of said gel holders along the length of said respective light source;
   a plurality of spring-biased access covers disposed in spaced apart arrangement thereof along said side portions of said shooting table, along said side walls of said rear cove and along said front and rear portions of said dome cove to cover said first and second ends of said light sources;

a control panel adapted for adjusting intensity levels of said light sources; and memory means, a desired lighting pattern represented by said intensity levels of said light sources, and type and position of said gels being recorded within said memory means.

19. The studio lighting system of claim 18, further including controlling means, said controlling means retrieving from said memory means data adequate to said desired lighting pattern and reproducing said desired lighting pattern.

20. The studio lighting system of claim 8, wherein said control panel further includes reference points corresponding to respective light sources within said at least one light holding module.

* * * * *